(12) United States Patent
Shah et al.

(10) Patent No.: US 6,528,151 B1
(45) Date of Patent: Mar. 4, 2003

(54) EXTRUDED FIBER REINFORCED CEMENT MATRIX COMPOSITES AND METHOD OF MAKING SAME

(75) Inventors: Surendra P. Shah, Evanston, IL (US); Yixin Shao, Evanston, IL (US); Shashi Marikunte, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 09/283,765

(22) Filed: Apr. 1, 1999

Related U.S. Application Data

(62) Division of application No. 08/936,349, filed on Sep. 24, 1997, now Pat. No. 5,891,374, which is a continuation of application No. 08/490,210, filed on Jun. 14, 1995, now abandoned, which is a continuation of application No. 08/190,335, filed on Feb. 1, 1994, now abandoned.

(51) Int. Cl.$^7$ ................................................ B32B 13/02
(52) U.S. Cl. ..................................... 428/221; 428/294.7
(58) Field of Search .............................. 428/221, 292.1, 428/294.7

(56) References Cited

U.S. PATENT DOCUMENTS

| | | | | |
|---|---|---|---|---|
| 3,865,779 | A | 2/1975 | Oya et al. | 260/42.44 |
| 4,066,723 | A | 1/1978 | King et al. | 264/34 |
| 4,772,328 | A | 9/1988 | Pfeifer | 106/97 |
| 5,047,086 | A | 9/1991 | Hayakawa et al. | 106/731 |
| 5,106,557 | A | 4/1992 | Rirsch et al. | 264/118 |
| 5,108,679 | A | 4/1992 | Rirsch et al. | 264/118 |
| 5,154,771 | A | 10/1992 | Wada et al. | 106/730 |
| 5,385,764 | A | 1/1995 | Andersen et al. | 428/34.4 |
| 5,543,186 | A * | 8/1996 | Anderson et al. | 428/34.4 |
| 5,676,905 | A | 10/1997 | Andersen et al. | 264/426 |

* cited by examiner

Primary Examiner—Edward J. Cain

(57) ABSTRACT

An extruded fiber reinforced cement matrix composite having substantially improved tensile strength with strain hardening behavior and substantially improved tensile strain, and improved flexural properties in three-point bending is made by mixing cement, water, water soluble binder, and relatively short, discontinuous reinforcing fibers, preferably short polyvinyl alcohol fibers, to provide an extrudable mixture, the extruding the mixture to shape, and curing the cement.

5 Claims, 23 Drawing Sheets

EXTRUDED FIBER REINFORCED CEMENT MATRIX COMPOSITES AND METHOD OF MAKING SAME

This is a division of Ser. No. 08/936,349, filed Sep. 24, 1997 now U.S. Pat. No. 5,891,374 which is a continuation of Ser. No. 08/490,210 filed Jun. 14, 1995, abandoned, which is a continuation of Ser. No. 08/190,335 filed Feb. 1, 1994, abandoned.

FIELD OF THE INVENTION

The present invention relates to an extruded discontinuous fiber-reinforced cement matrix composite and method of making same using extrusion techniques.

BACKGROUND OF THE INVENTION

Cement and concrete are relatively brittle materials with low tensile strength. In attempts to overcome this deficiency of cement and concrete materials, randomly oriented, short discontinuous fibers have been introduced into the cementitious material as a reinforcing material for the cementitious matrix. However, addition of fibers tends to increase the viscosity of the cementitious matrix and to render the material difficult to handle and place. For this reason, in bulk construction using conventional mixing techniques/ equipment, only short fibers (e.g. 25 millimeters length) and low fiber volume fractions (e.g. less than 1%) have been used heretofore. For such reinforced cementitious materials, the fibers do not significantly influence the tensile strength of the matrix. Only after the matrix has cracked do the fibers contribute to strength by bridging existing cracks.

Several techniques are used to make commercial fiber-reinforced cement products. The known Hatschek process was initially developed for production of asbestos composites and is now utilized for manufacture of non-asbestos, short discontinuous fiber (e.g. wood fibers and/or polyethylene pulp) reinforced cement composites. In this process, a fiber-cement mixture with excess water is deposited (e.g. roll coated) on a felt band substrate, vacuum dewatered, calendared, and cured to form a fiber reinforced cement matrix in sheet form. However, this method is suitable only for fiber types which retain cement particles during vacuum dewatering. Composites made by the Hatschek process are brittle and only good for sheet.

U.S. Pat. No. 5,108,679 describes manufacture of discontinuous fiber-reinforced cement roofing products using the known roller and slipper process. In this process, the premixed materials including not more than 4 weight % fibers are compressed by passage through rollers and then slipper to obtain flat reinforced sheets to which the process is limited.

Other manufacturing techniques for fiber-reinforced cement products employ continuous fibers rather than short, discontinuous fibers. For example, the known Reticem process produces cement laminate composites with 20 to 30 continuous fiber mesh layers. In particular, each fiber mesh layer is fed from a mesh supply reel, spray coated with cement, covered with the next mesh layer that is then spray coated with cement and so on to form the multi-layered laminate that is compacted, trimmed to length, and cured.

The known pultrusion process produces continuous fiber-reinforced structural shapes with very high fiber volume ratios. In particular, in practice of the pultrusion process, continuous fiber mats are fed from stationary and roving mat creels to a cement slurry bath for coating. Then, the coated mats are formed to shape and cured under pressure.

The Reticem and pultrusion processes described above are disadvantageous in that they require continuous fibers and the processing/equipment technology for incorporating the continuous aligned fibers in the cement matrix are costly. As a result, these processes has been used for the most part in the manufacture of specialty products, such as thin sheets.

U.S. Pat. No. 4,066,723 describes production of laminated cement sheets wherein an unreinforced sheet of concrete is extruded, reinforcing fibers are then distributed onto the surface of the sheet, and these steps are repeated to produce a flat lamination. The process is limited to production of flat laminated products.

It is an object of the present invention to provide a method of making discontinuous fiber reinforced cement matrix composites, as well the reinforced cement composites themselves, using relatively high volume fractions of discontinuous reinforcing fibers by die extrusion to provide improved mechanical properties in that direction.

SUMMARY OF THE INVENTION

The present invention provides a method of making a fiber reinforced cement matrix composite having improved strength wherein hydraulic cement, water, water soluble binder for viscosity control, and discontinuous reinforcing fibers are mixed to provide an extrudable mixture having the reinforcing fibers substantially uniformly dispersed therein. The mixture is extruded through an extrusion die orifice having a desired configuration for the composite to provide increased tensile properties of the cured composite as compared to an unreinforced cement matrix or a cast composite of similar composition. The mixture can be extruded to preferentially align the fibers in the extrusion direction to an extent to increase tensile properties as compared to those in the transverse direction of the extruded composite. Although aligned in the direction of extrusion, the reinforcing fibers remain substantially uniformly dispersed throughout the cement matrix of the extruded shape. Alternately, the mixture can be extruded with little or no preferential fiber alignment and yet achieve improved tensile properties in all directions of the composite as compared to a cast composite of similar composition. The extruded shape then is subjected to a curing operation to cure the cement matrix. The discontinuous fiber reinforced cement matrix can be extruded to have the configuration of a flat sheet, pipe, rod, beam, tube, honeycomb, and other structural shapes.

In practicing one embodiment of the invention, the cement preferably comprises a hydraulic cement, such as Type I portland cement. The weight ratio of water to cement preferably is within the general range of 0.2 to 0.4. The discontinuous reinforcing fibers can be selected from the group consisting of polyvinyl alcohol, carbon, steel, polypropylene, cellulose and others and are present from about 4% to about 10% by volume based on dry constituents of the extrudable mixture. The water soluble binder typically is used with a water reducing agent in the extrudable mixture to adjust viscosity of the mixture to the appropriate level for extrusion pursuant to the invention.

In one embodiment of the invention, silica fume is mixed with the cement constituent in formation of the extrudable mixture. The silica fume preferably comprises silica fume powder having a size not exceeding about 1 micron in aqueous slurry. The weight ratio of silica fume powder to cement is up to 0.30.

In a particular embodiment, the present invention provides a method of making a fiber reinforced cement matrix composite having improved tensile strength in the extrusion direction, strain hardening behavior with improved tensile strain (e.g. at least 1% tensile strain) and improved flexural strength in three-point bending. In practicing this embodiment of the invention, hydraulic cement, water, water soluble binder, and discontinuous reinforcing fibers comprising a hydrophilic polymeric material, such as polyvinyl alcohol fibers, are mixed to provide the extrudable mixture, the mixture is extruded to shape with the discontinuous fibers preferentially aligned in the extrusion direction of the extruded shape, and the cement is cured.

The present invention also provides a fiber reinforced cement matrix composite having a die extruded shape and improved tensile properties in all directions of the composite as compared to a cast composite of similar composition.

The present invention also provides a fiber reinforced cement matrix composite having an extruded shape and having substantially improved tensile strength compared to a cast composite of similar composition, strain hardening behavior with substantially improved tensile strain and improved flexural strength in three-point bending.

The present invention provides a fiber reinforced cement matrix composite having an extruded shape and improved tensile properties in the extrusion direction compared to an unreinforced matrix or a cast composite of similar composition. The composite comprises a cured cement matrix and discontinuous reinforcing fibers dispersed in the matrix and preferentially aligned in the extrusion direction of the composite to an extent to increase the relative tensile properties of the cured composite in that direction as compared to the transverse direction by virtue of extrusion of the cementitious mixture.

The objects, advantages and capabilities of the present invention will become more readily apparent with reference to the following detailed description of certain embodiments along with the following drawings.

DETAILED DESCRIPTION OF THE INVENTION

Figure 1:
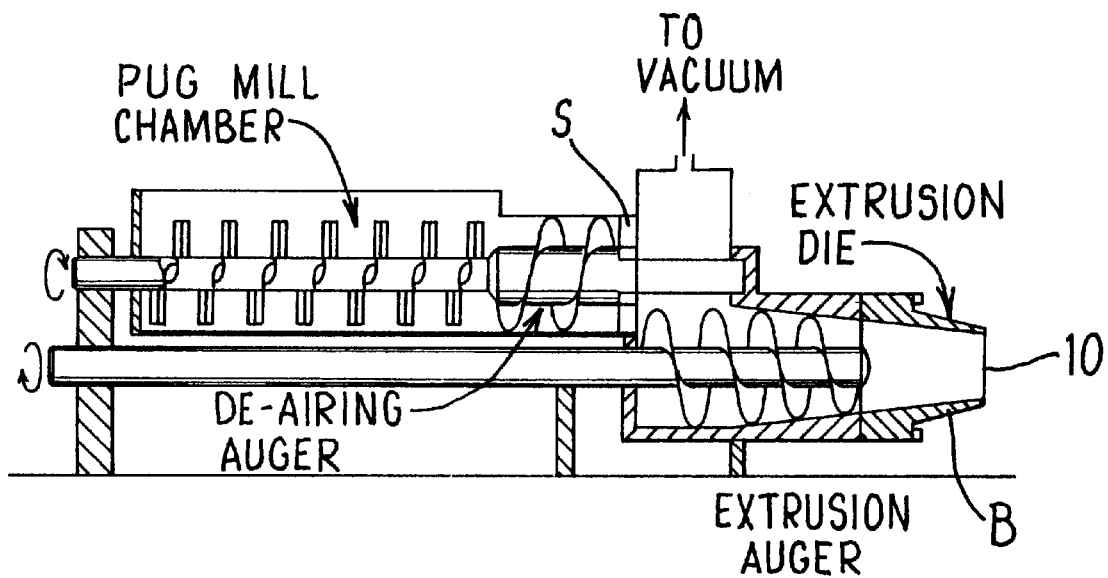
FIG. 1 is a schematic sectional view of an auger extruder used to practice an embodiment of the invention.

Practice of the present invention involves providing an extrudable cementitious mixture comprising selected constituents suitable for producing a fiber reinforced cement matrix composite having mechanical properties suited for a particular service application and extruded length and shape. The present invention can be practiced to produce extruded discontinuous fiber reinforced cement matrix composites having high tensile and flexural strengths and toughness comparable to more costly continuous fiber cement matrix composites with some composites of the invention exhibiting work hardening behavior when stressed in tension. The extruded discontinuous fiber reinforced cement matrix composites of the invention can be extruded to a variety of shapes including structural shapes, such as flat sheet, contoured sheet, pipe, rod, I-beam, tube, honeycomb, and other solid or hollow shapes without the need for a substrate, such as the felt band substrate of the aforementioned Hatschek process and without the need for continuous fibers of the aforementioned Reticem and pultrusion processes. The invention thus provides a substrateless composite reinforced with discontinuous fibers and extruded as a monolithic body or article of manufacture without laminated layers a variety of useful shapes.

The extrudable mixture typically comprises hydraulic cement, water, water soluble binder, and discontinuous reinforcing fibers in proportions to provide an extrudable cementitous dough or paste. Other optional constituents, such as additives and organic and/or inorganic processing aids and/or fillers, can be present in the uncured mixture (cementitious dough or paste) as needed to impart thixotropic rheology and viscosity characteristics that facilitate extrusion to achieve in-situ fiber alignment for a given extrusion die and mixture chemistry and density. Selection of the mixture constituents will depend on the type, size and volume fraction of fibers present, the type of extrusion and other processing parameters to be employed, and the shape of the composite (i.e. the extrusion die orifice configuration) such that the fibers present in the mixture are preferentially aligned (in-situ during extrusion) in the extrusion direction of the extruded shape, the fibers and surrounding cementitious matrix are compressed together to provide intimate interfaces therebetween and minimize porosity of the resulting fiber reinforced cement matrix composite.

The hydraulic cement included in the mixture typically comprises type I portland cement (silicate cement) as a result of its relatively low cost and ready processability, although the invention is not so limited and can be practiced using other types of hydraulic cements, such as rapid-hardening cement, calcium aluminate cement and others as well as mixtures thereof. As is known, hydraulic cement refers to a cement that sets and hardens in the presence of water. The hydraulic cement preferably is used in conjunction with silica fume in the extrudable mixture. Silica fume is beneficial for reducing porosity and increasing strength of the cured fiber reinforced cement matrix composite. The silica fume typically is dispersed in the extrudable mixture by addition in aqueous slurry form (50 weight % water/50 weight % silica fume powder) as described herebelow in the Examples. The silica fume (available as force 10,000 from W.R. Grace & Co. Bedford Park, Ill.) to cement (type I portland cement) ratio was maintained at 0.18 in the Examples, although the invention is not so limited and can be practiced using silica fume to cement ratios of 0.05 to 0.30.

Water is present in the extrudable mixture in controlled amounts to impart, in conjunction with other additives, adequate thixotropic rheology and viscosity to the cementitous dough or paste for extrusion to shape with preferential alignment of the fibers in a load-bearing direction of the composite. The amount of water present is controlled to a minimum in order to maintain high composite strength yet be sufficient to effect adequate cement hydration and dissolve the water soluble binders described herebelow. A typical ratio of water to hydraulic cement is 0.24 to 0.29, more generally 0.2 to 0.4, depending on the particular constituents of the extrudable mixture. Of course, the amount of water present will depend upon the other additives used in the mixture as well as the amount of aggregates, if any, used in the mixture. The Examples set forth herebelow illustrate the addition of water to the mixture via the silica fume slurry addition, although the invention is not limited in this regard.

Aggregate optionally can be included in the extrudable mixture to enhance rheological characteristics of the cementitious dough or paste. An illustrative aggregate comprises a lightweight aggregate available commercially as Microlite aggregate from Specrete-IP, Inc, Cleveland, Ohio. This lightweight aggregate is essentially a metastable amorphous aluminum silicate with a porous honeycomb microcellular structure composed of tiny air cells. Incorporation of such lightweight aggregate in the composite reduces it weight and improves thermal insulation of the composite. Generally, such lightweight aggregates are present in an amount ranging from about 10 to 50 volume % of the extrudable mixture to avoid strength reduction in the final cured composite. The invention is not limited to the aforementioned lightweight aggregate and can be practiced using other aggregates, such as sand, expanded polystyrene beads, vermiculate, expanded shale and/or other materials.

A variety of discontinuous (i.e. short length). reinforcing fibers can be used in practicing the invention. For purposes of illustration and not limitation, the discontinuous fibers can be selected from the group consisting of polyvinyl alcohol (PVA) fibers, pitch based carbon fibers, steel fibers, polypropylene (PP) fibers, and cellulose fibers. Table 1 here below sets forth dimensions and mechanical properties for these fibers.

PVA fibers used in the Examples set forth herebelow were available from Kuraray Co., Ltd. Osaka, Japan, and are made from polyvinyl alcohol resin. As a result of the inherent affinity of the molecule for water (hydrophilic fiber) due to the presence of hydroxyl groups thereon and the surface treatment (providing a tortuous surface on a microscopic scale), the PVA fibers are readily dispersed in the extrudable mixture and provide a strong interfacial bond with the matrix in the cured composite. Other hydrophilic fibers that could be used in lieu of PVA fibers include, but are not limited to polyacrylic, polyethylene, polyacrylamide, or other fibers derived from vinyl acetate and any fibers (e.g. cellulose fibers discussed below) which can promote hydrogen bonding to the backbone of the fiber molecule as a result of being water soluble, water dissolvable and/or hydrolyzable by the water present in the, cementitous dough.

Pitch based carbon fibers comprise a graphitic crystalline structure and exhibit a high modulus. Pitch based carbon fibers used in the Examples herebelow were available from Kureha Chemical Industry Co., Ltd. Tokyo, Japan.

Polypropylene fibers used in the Examples comprise high molecular weight polypropylene and are alkali resistant, have a relatively high melting point, and low cost. Monofilament PP fibers were used in the Examples herebelow and were available from W.R. Grace & Co., Bedford park, Ill.

Microsteel fibers used in the Examples herebelow were short in length (1–3 mm) and small in diameter (30–50 microns) and were easy to mix and disperse in the extrudable mixture. Microsteel fibers used in the Examples herebelow were available from Novocon International Inc., Mt. Prospect, Ill.

Cellulose fibers used in the Examples herebelow were of the SSK type available from Proctor & Gamble Co., Cincinnati, Ohio. These fibers comprise bleached southern softwood kraft pulp liberated from slash pine. The fibers contain the naturally occurring fraction of summerwood-versus-springwood fibers and average fiber length.

Table 1 herebelow sets forth dimensions and mechanical properties for the fibers used in the Examples herebelow.

TABLE 1

| Fiber type | Density | Length | Diameter | Aspect ratio | Tensile strength | Modulus |
|---|---|---|---|---|---|---|
| PVA | 1.3 g/cc | 6 mm | 15 $\mu$m | 400 | 0.9 GPa | 29 GPa |
| Carbon | 1.6 g/cc | 6 mm | 12 $\mu$m | 500 | 0.55 GPa | 45 GPa |
| Polypropylene | 0.9 g/cc | 19 mm | 30 $\mu$m | 633 | 0.37 GPa | 3.6 GPa |
| Steel | 7.8 g/cc | 1–3 mm | 30–50 $\mu$m | 33–60 | 1.4 GPa | 200 GPa |
| Cellulose | 1.5 g/cc | 2.55 mm | 30–120 $\mu$m | 20–85 | 0.5 GPa | 25–40 GPa |

Certain processing aids are used in practicing the invention to achieve the proper rheology and viscosity of the extrudable mixture (cementitious dough) for extrusion to achieve in-situ fiber alignment in the extrusion direction of the composite and other benefits described hereabove. For example, the extrudability (workability) of the cementitious dough is modified by inclusion of one or more water soluble binders that are present to adjust the viscosity of the cementitious dough to the desired level for extrusion. An illustrative water soluble binder for use in the invention comprises water soluble cellulose type molecular binder comprising hydroxypropyl methylcellulose available as METHOCEL binder from Dow Chemical Co., Midland, Mich. This binder modifies the mixture to a medium level of viscosity. Another illustrative water soluble binder comprises water soluble polymer resin available as POLYOX binder from Union Carbide Chemicals and Plastics Company Inc., Danbury, Conn. This binder modifies the mixture to a relatively low level of viscosity. Although the Examples herebelow employ a 65 weight % METHOCEL/35 weight % POLYOX proportion binder system, to provide desired viscosity, the invention can be practiced using a single water soluble binder, such as either the METHOCEL binder or the POLYOX binder discussed above. The invention is not limited to these particular binders, however. The ratio of the aforementioned binder(s) to cement was maintained about 0.01 in the Examples herebelow to reduce moisture sensitivity of the cured composite.

The extrudability (workability) of the cementitious dough also is modified by inclusion of a water reducing agent. An illustrative water reducing agent comprises high range water reducer (HRWR) available from W.R. Grace & Co., Bedford Park, Ill. and comprising linear polymer containing a sulfonic acid group attached to the polymer backbone at regular intervals. The sulfonic acid groups neutralize surface charges on the cement particles, thereby facilitating dispersion in the cementitious paste. Once the water content of the cementitous paste is determined, the quantity of HRWR was varied in the Examples herebelow to modify workability of the dough to the degree for extrusion pursuant to the invention. The weight ratio of the water reducing agent, HRWR, to cement in the extrudable mixture generally is controlled at up to 0.06.

The fibers are present in the extrudable mixture in a volume fraction to achieve improved tensile properties (i.e. tensile strength and tensile strain) in the final cured composite suited to the intended service application and yet maintain an extrudable mixture as described hereabove. Typically, the fibers are present generally from about 4 to about 10 volume fraction based on the aforementioned mixture constituents in dry form.

In the Examples herebelow, the fibers were present in 4 volume % and 8 volume % of the dry mixture constituents for purposes of illustration, not limitation. All volume fractions of fibers set forth herein are based on the dry extrudable mixture constituents.

In extruding the cementitious dough pursuant the invention, the extrusion die orifice forms the dough under compressive and shear forces effective to configure the dough to the die shape and, if desired, to achieve in-situ preferential alignment of the fibers in the extrusion direction of the extruded shape (see FIG. 21), compression of the fibers and surrounding cementitious matrix together to provide intimate interfaces therebetween and reduced porosity of the resulting fiber reinforced cement matrix composite shape. The extrudable mixture (cementitious dough) can be extruded to shape under conditions of high shear and high compressive forces to achieve in-situ preferential alignment of the fibers in the extrusion direction of the extruded shape to an extent to increase the relative tensile properties of the cured composite in that direction as compared to the transverse direction.

In practicing a preferred embodiment of the invention, the cementitious dough is extruded using a auger extruder (screw type extruder) having a suitable die orifice for the intended extruded shape. An illustrative auger extruder capable of extruding 2000 pounds of cementitious dough per hour is shown schematically in FIG. 1 and is available as Starkey Model 990H-1, 3HP motor from Starkey Machinery Inc., Galion, Ohio. This auger extruder was used in the Examples set forth herebelow to extrude the cementitious dough to desired shape.

The invention is not limited to the auger extruder illustrated in FIG. 1 and can be practiced using other die extruder devices, such as a ram extruder, wherein a extruder ram is powered by a hydraulic press to ram the cementitious dough in an extruder barrel through a suitable extruder die orifice for the intended extruded shape. Ram extrusion was used in practicing the invention to determine proper proportions of the constituents of the cementitious dough.

The extent to which the reinforcing fibers are aligned in-situ in the extrusion direction, and thus the mechanical properties in that direction, can be controlled by adjustment of the extrusion pressure exerted on the cementitious dough. This pressure can be varied by, for example, viscosity of the cementitious dough, rate of extrusion, and die design.

Figure 21:
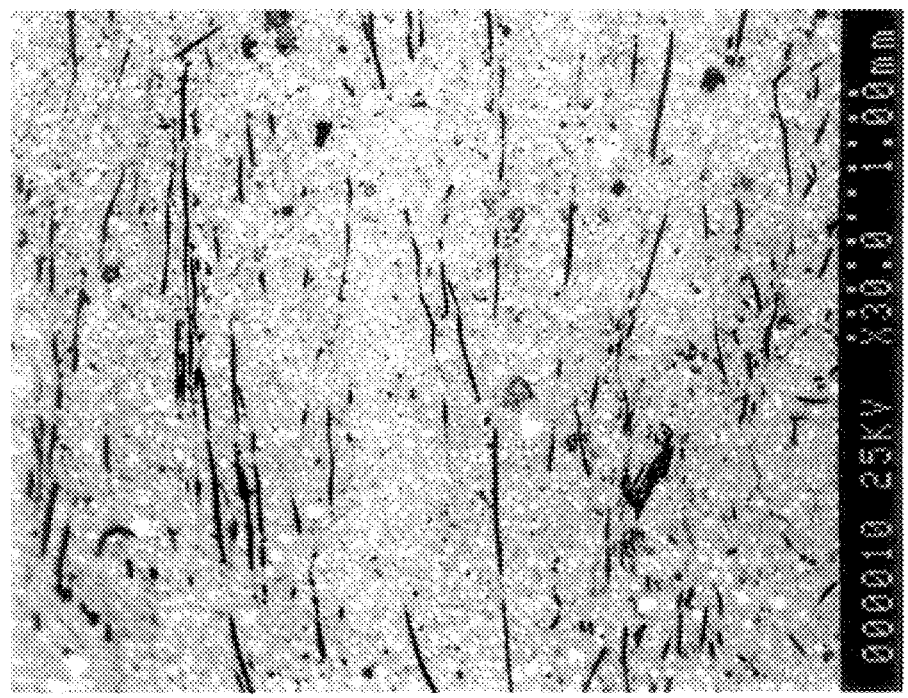
FIG. 21 is a scanning electron micrograph at 30×magnification of a section of an extruded 4 volume % PVA fiber reinforced composite of the invention wherein the specimen extrusion direction is the vertical direction in the micrograph and the fibers exhibit substantial alignment in that direction.

The reinforcing fibers can be aligned in the extrusion direction to varying extents needed to provide improved mechanical properties, such as tensile strength, in that direction. FIG. 21 illustrates a high degree of preferential alignment of PVA reinforcing fibers to optimize tensile strength in the extrusion direction; however, lesser degrees of preferential fiber alignment in the extrusion direction can be provided. within the scope of the invention as required. for other service applications where less relative strength is required in the extrusion direction.

Figure 22:
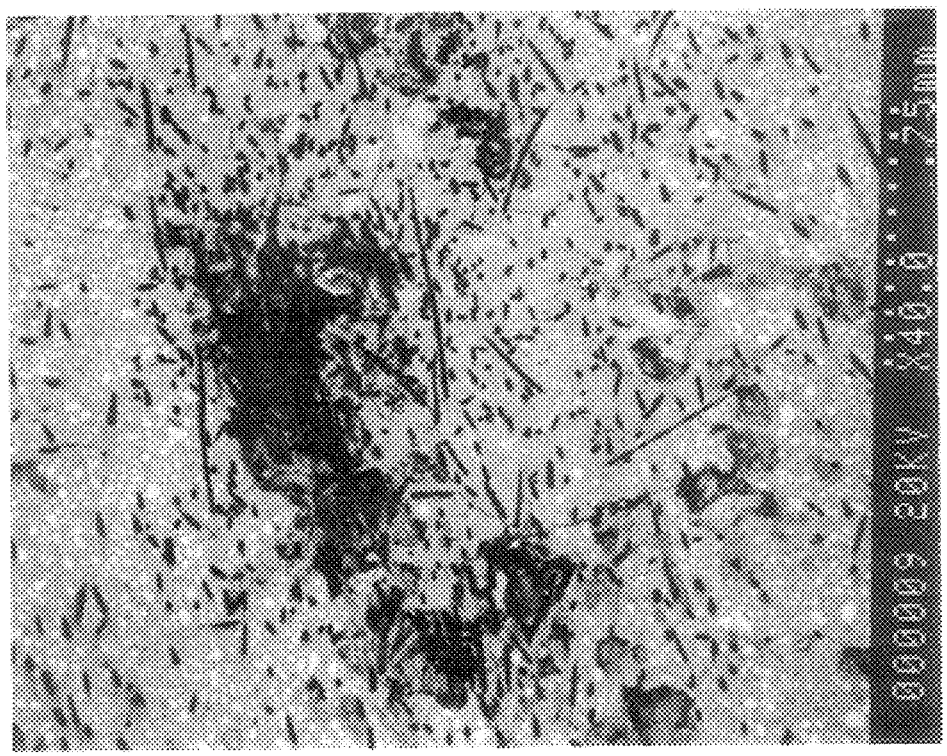
FIG. 22 is a scanning electron micrograph at 40×magnification of a section of an extruded 4 volume % carbon fiber reinforced composite of the invention wherein the specimen extrusion direction is in the vertical direction in the micrograph and the fibers exhibit little or no alignment in that direction; i.e. random fiber orientation.

Thus, the invention can be practiced over a range of parameters wherein, on one hand, little or no preferential alignment of the reinforcing fibers is achieved in the extrusion direction as illustrated, for example, in FIG. 22 and wherein, on the other hand, substantial preferential fiber alignment is achieved in the extrusion direction as illustrated, for example, in FIG. 21. However, even when the extrusion and other parameters are selected to provide little or no preferential fiber alignment in the extrusion direction, the resulting extruded, cured fiber reinforced cement matrix composite exhibits increased tensile properties in all directions (isotropic properties) of the composite as compared to a cast composite of similar composition; i.e. having similar fibers/fiber fraction in a similar cement matrix.

When substantial preferential fiber alignment is achieved in the extrusion direction by appropriate selection of extrusion and other parameters, the extruded and cured composite exhibits dramatically improved tensile properties in the extrusion direction as compared to a direction transverse to the extrusion direction for demanding and severe service applications that may be encountered. Generally, the tensile properties of the composite can be tailored in this manner to suit a variety of service application requiring improved tensile properties of a more isotropic nature or of an anisotropic nature (i.e. in the direction of extrusion of the composite). Moreover, the tensile properties in directions other than the extrusion direction (e.g. transverse direction) are still increased in practicing the invention as compared to a cast composite of similar composition. For example, tensile properties of the composite of the invention with little or no fiber alignment are compared in all directions over a similar cast composite. The composite having preferentially aligned fibers exhibits increased tensile properties not only in the extrusion direction but also other directions as compared to a cast composite.

Dies of a variety of geometries and shapes can be used in practicing the invention. For purposes of illustration and not limitation, extrusion dies having a 0.25 inch diameter orifice and 1.0 inch diameter orifice were used to produce extruded lengths of respective 0.25 and 1.0 inch diameter solid uncured cementitious rods. A die orifice having a width of 3 inches and height of 0.25 inch was used to produce extruded lengths of rectangular cross-section uncured cementitious flat sheet. A 1 inch by 1 inch honeycomb die orifice was used to produce extruded lengths of uncured cementitious honeycomb. The extrusion dies are made of stainless steel to withstand the forces and abrasion associated with extrusion of the cementitious doughs or pastes.

The aforementioned mixture components are premixed to proper viscosity prior to introduction to the extruder. A typical premix schedule used in practice of the Examples hereinbelow involved preparing a dry premixture of type I portland cement particles and water soluble binder particles by placing the particles in a cylindrical container and shaking and rolling the container until the binder particles were fully dispersed in the cement. Alternately, the cement particles and binder particles were dry mixed in a conventional high frequency vibration mixer available as Omni mixer from Chiyoda Technical & Industrial Co., Ltd., Tokyo, Japan.

A suitable silica fume slurry was prepared and then mixed with the particular discontinuous reinforcing fibers to be incorporated in the cement matrix to insure all fibers were wetted. The silica fume slurry/fibers were mixed in a conventional high shear mixer; e.g. type G60 read vertical mixer available from G.S. Blakelee & Co., Chicago, Ill. at a nominal mixer speed of 450 rpm.

A cement/binder premixture then was slowly added to the slurry/fibers while a selected amount of water also was added slowly and continuously. The batch began in a short time (e.g. 10) minutes to gain cohesion among the particles present due to the reaction of the water soluble binder with the water present. However, the required viscosity for extrusion was not achieved at this point. High range water reducer was then added to replace the remaining amount of water required to attain a desired level of viscosity for extrusion. The water reducer was added slowly in liquid form into the batch until a dough-like viscosity was obtained. The speed of the mixer was increased from nominal 250 rpm to nominal 450 rpm so that the dough-like mixture (cementitious dough) was quickly kneaded several times to reach a uniform dough mix of putty-like consistency. The premixing operation to provide the dough cementitious paste or mixture took about 5 to 10 minutes.

Figure 2:
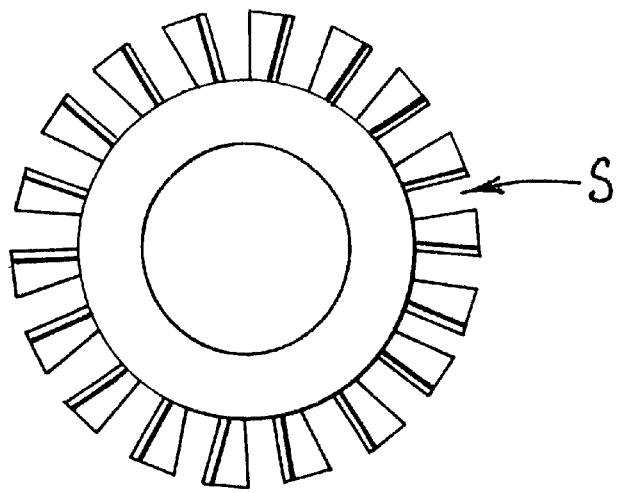
FIG. 2 is an elevational view of the shredder located in the auger extruder.

The extrudable mixture (cementitious dough) then can be supplied immediately (e.g. within 10 minutes) to the extruder for extrusion to desired length and shape through the die orifice 10. In. practicing the invention using the extruder shown in FIG. 1, the cementitious dough is supplied to the pug mill chamber of the extruder. In the pug mill chamber, the components of the cementitous dough are further mixed and pushed through a shredder S shown in FIG. 2. The geometry of the shredder S is chosen as needed to accommodate different fiber geometry (e.g. longer length) to avoid shredding of the fibers by the shredder blades. In particular, the space or distance between the shredder blades is chosen to this end.

In conducting the Examples hereinbelow, the shredder blades are angled at an angle of 45° relative to the axis of the extruder and are spaced circumferentially apart by 0.5 inches (blade edge-to-blade edge).

At the position of the shredders, a vacuum system communicates to the pug mill chamber to remove air from the cementitious dough. Thus, while the cementitious dough passes through the shredder S, it is deflocculated by the shredder orifices and also deaerated by the vacuum system. A vacuum level of 25–30 inches of mercury was used to this end.

After leaving the shredder, the cementitous dough was coagulated again and pushed through the extrusion die orifice 10 by the extrusion auger shown in FIG. 1.

The cementitious dough is extruded to a shape corresponding to the die orifice 10 and to an extruded length determined by the composite dimensions selected. As shown in FIG. 1, the extrusion die includes a tapered, converging barrel B in the end of which is an orifice 10.

For purposes of illustration, the auger extruder described hereabove and used in the Examples hereinbelow extruded cementitious dough at about ½ foot in length per second with a rectangular cross of 3 inches width by 0.25 inch in thickness.

The extruded cementitious dough composite shape typically is cut to selected length and then covered for about 24 hours with one or more moisture impermeable plastic sheets to achieve initial cure of the cement matrix in an isolated moist environment. After about 24 hours, the initially cured extruded cementitious dough composite shape is submerged in a water tank at room temperature (20° C.) for curing of the cement matrix. Curing was continued for 28 days in the water tank. However, other curing times and environments can also be used in practicing the invention.

For purposes of illustration, extruded cementitious dough sheets (specimen composition given in Table 2) that were 3 wide inches by 0.25 inch thick by 12 inches length were sandwiched between flat sheets of 24 inch×24 inch×1½ inch thickness plexiglass. About 5 psi pressure was applied to the upper sheet by a weight to retain flatness. The sandwiched extruded sheets were cured in a moist room (100% relative humidity) for 24 hours under such pressure.

Table 2 herebelow sets forth various Examples of extrudable mixtures (cementitious dough) that were prepared, extruded and cured in the manner described hereabove. A control Example comprised only the cement matrix made from the components listed in the Table without any reinforcing fibers present.

variable displacement transducers (LVDT) with the gage length of 3 inches. This displacement was used as a feedback control. Statistical methods were used to determine the strength and the Young's modulus of the composites by averaging the test results from at least 5 test specimens.

Figure 3:
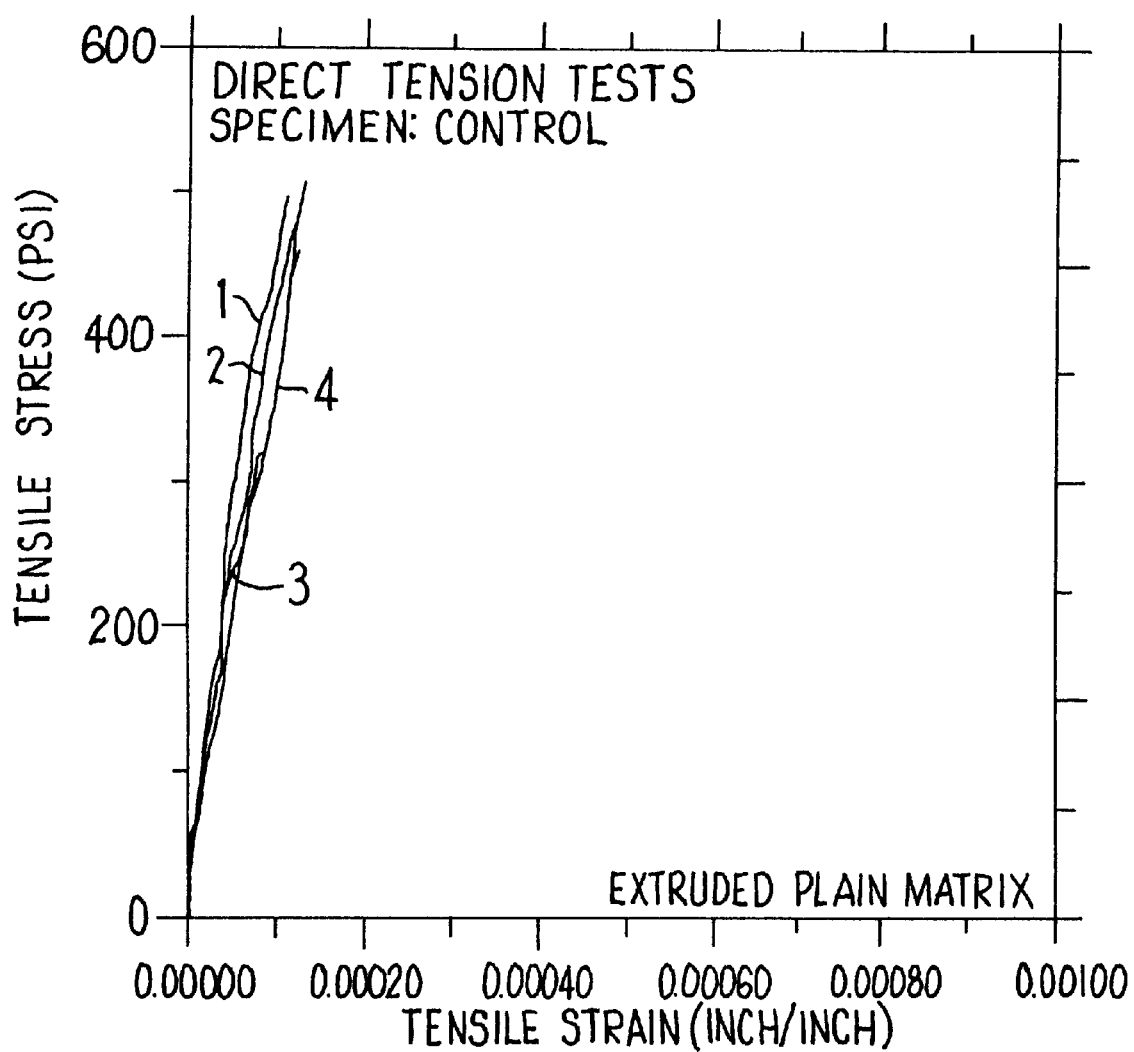
FIG. 3 illustrates graphs of tensile stress versus tensile strain for four (4) specimens comprising unreinforced cement matrix (i.e. without reinforcing fibers).

FIG. 3 illustrates the tensile stress versus tensile strain for unreinforced cured cement matrix specimens made from the "control" Example composition set forth in Table 2. The unreinforced matrix specimens exhibited typical brittle behavior, breaking suddenly at peak tensile stress. The average tensile strength of these specimens was 487.5 psi and the average Young's modulus was 4.01×106 psi. These values represent control or reference values for comparison to the strength and modulus values determined for the extruded fiber reinforced cement matrix composite specimens of the invention.

Figure 4A:
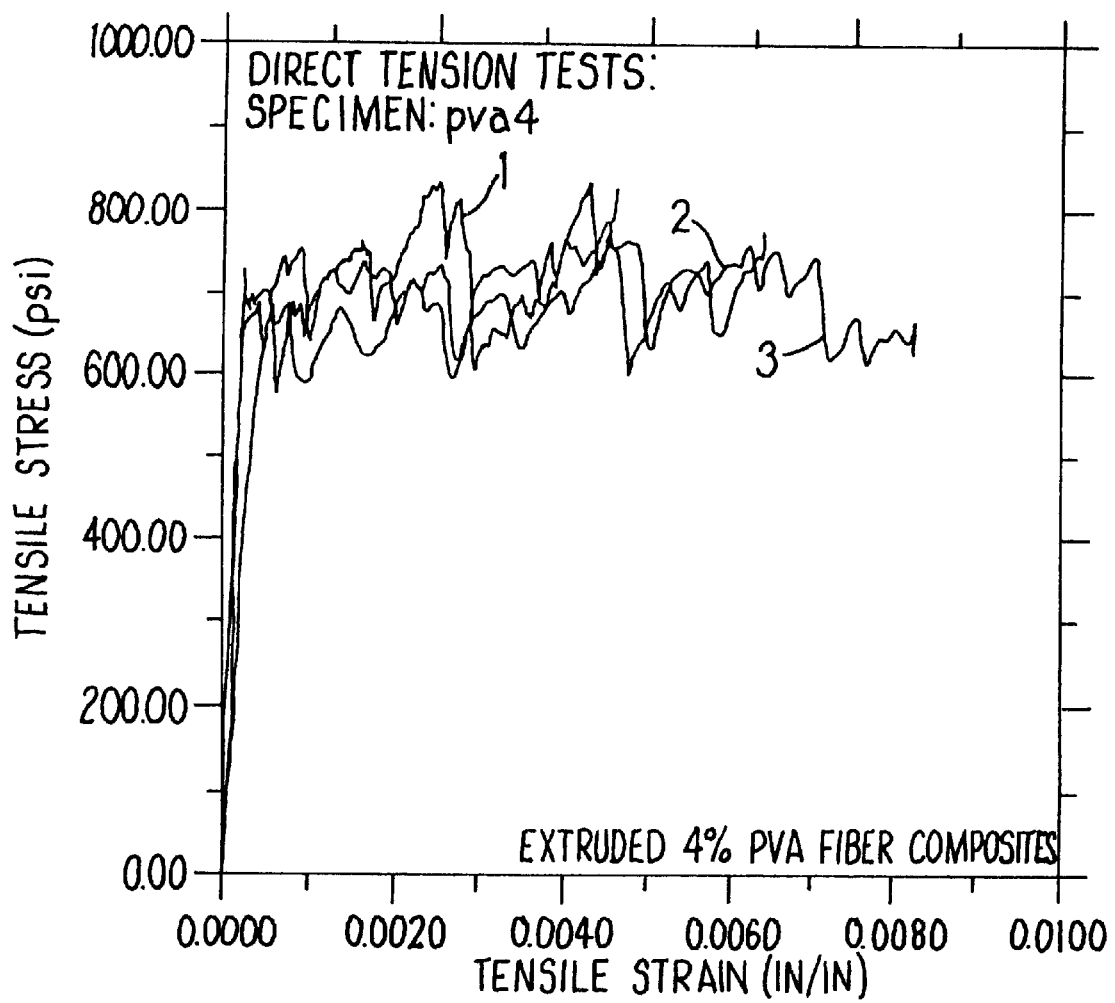
FIG. 4A illustrates graphs of tensile stress versus tensile strain for three (3) specimens comprising the cement matrix reinforced with 4 volume % and FIG. 4B illustrates similar data for two (2) specimens comprising 8 volume % discontinuous polyvinyl alcohol micro-fibers.
Figure 4B:
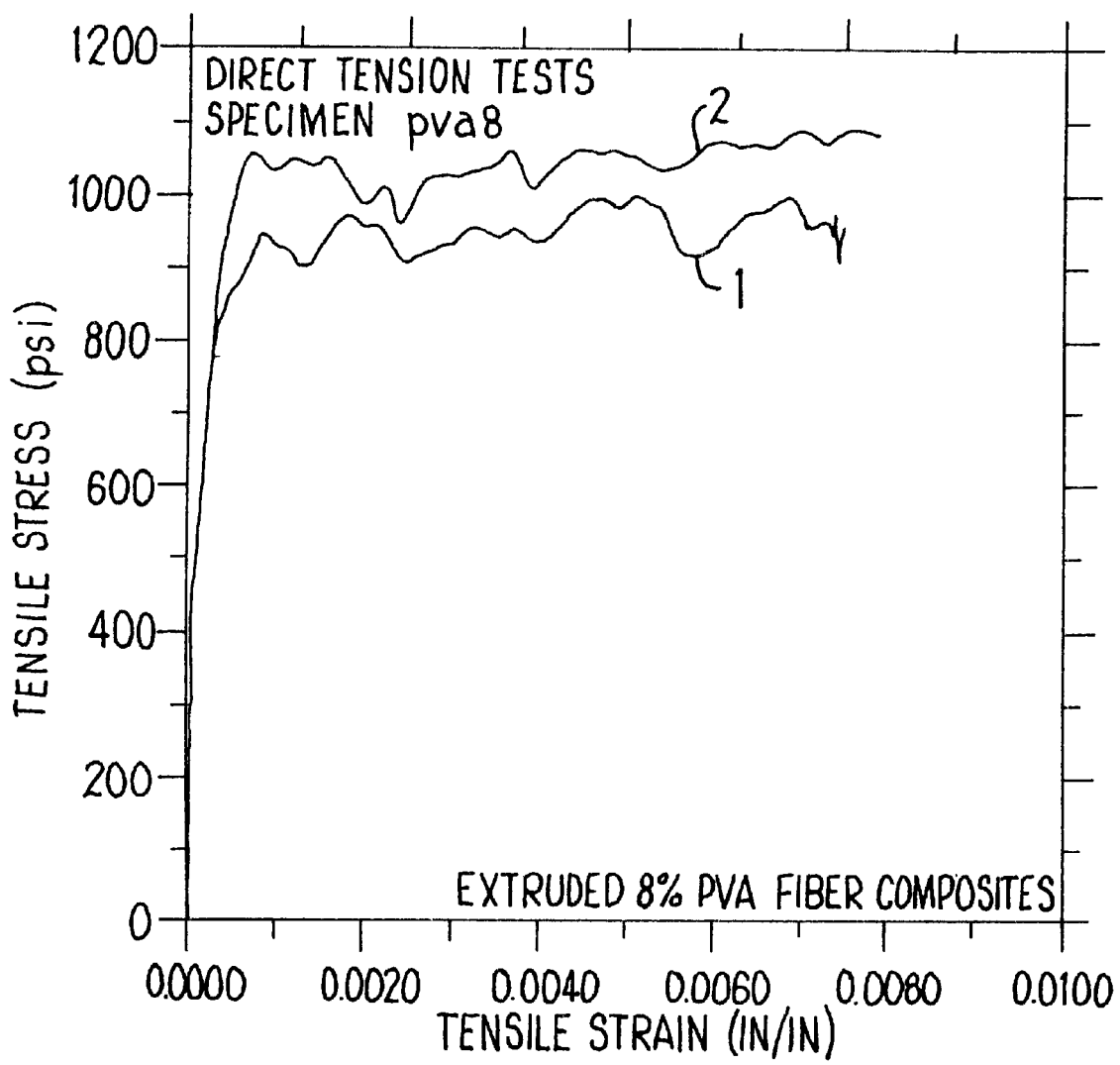

FIGS. 4A and 4B illustrate the tensile stress versus tensile strain for PVA fiber reinforced cured cement matrix composite specimens made from the Example compositions

TABLE 2

| Fiber fraction | Specimen | Fiber type | W/C | SF/C | Binder/C | HRWR/C | Aggregate |
|---|---|---|---|---|---|---|---|
| 0% | control | none | 0.27 | 0.18 | 0.009 | 0.43% | 0 |
| 4% | pva4 | PVA | 0.286 | 0.18 | 0.009 | 4.3% | 0 |
| | c4 | carbon | 0.256 | 0.18 | 0.009 | 2.8% | 0 |
| | st4 | microsteel | 0.256 | 0.18 | 0.01 | 3.0% | 0 |
| | cell4 | cellulose | 0.287 | 0.18 | 0.009 | 4.3% | 0 |
| | pp4 | polypropylene | 0.268 | 0.18 | 0.009 | 4.6% | 0 |
| | cm4 | carbon | 0.243 | 0.18 | 0.006 | 5.6% | microlite 10% C |
| 8% | pva8 | PVA | 0.282 | 0.18 | 0.009 | 5.6% | 0 |
| | st8 | microsteel | 0.256 | 0.18 | 0.0086 | 3.0% | 0 |
| | cell8 | cellulose | 0.288 | 0.18 | 0.0082 | 6.0% | 0 |

C: Type I Portland cement; W: water; SF: silica fume in slurry; HRWR: high range water reducer; Binder: 65% METHOCEL + 35% POLYOX As mentioned hereabove, various extruded composite shapes were produced. For example, 1 inch by 1 inch square cross section honeycomb composites of 5 inches length were produced from the cementitious composition designated specimen "control" in Table 2. One inch diameter solid rods of 6 inches length were produced from the cementitious composition designated specimen "c4" in Table 2. Solid rods having a diameter of 0.25 inch were produced from the cementitious composition designated specimen "c4" in Table 2. Flat sheets of 3 inches width and 0.25 thickness and 12 inches length were produced from the cementitious specimens in Table 2.

Extruded composite mechanical property test specimens were produced as flat sheets having a rectangular cross section with a width of 3 inches and thickness of 0.25 inch and a length of 12 inches. The specimens were produced from the Example compositions set forth in Table 2 in the manner described hereabove. All specimens were initially cured for 24 hours under plastic sheeting and then completely cured in the water tank for 28 days after extrusion.

Specimens for direct tension testing were made by cutting the extruded specimens into two 1 inch wide test specimens to provide final test specimen dimensions of 1 inch width, 0.25 inch thickness and 12 inches in length. Prior to tension testing, the opposite ends of the specimens were reinforced by gluing pieces of steel sheet to the ends to assure that failure of the specimen occurred within the 3 inch long gage length provided.

Direct tension testing was conducted on an MTS testing machine wherein tensile strain was measured by 2 linear listed for specimens "pva4" and "pva8" in Table 2. The 4% and 8% PVA fiber reinforced composite specimens exhibited strain hardening behavior in the tension tests. The descending and ascending points along the curves after the bend-over-point was reached indicate that the composite specimens were still capable of being reloaded even after the cement matrix suffered multiple cracking. A comparison of FIGS. 4A and 4B indicates that load transfer from matrix to fibers and from fibers to matrix was stabilized by the higher volume fraction of fibers of specimen "pva8". The 4% and 8% PVA composite specimens exhibited an average tensile strength of about 1000 psi and strain hardening behavior with a strain of at least about 1%. The average Young's modulus of the specimens is shown in Table 3.

Figure 5:
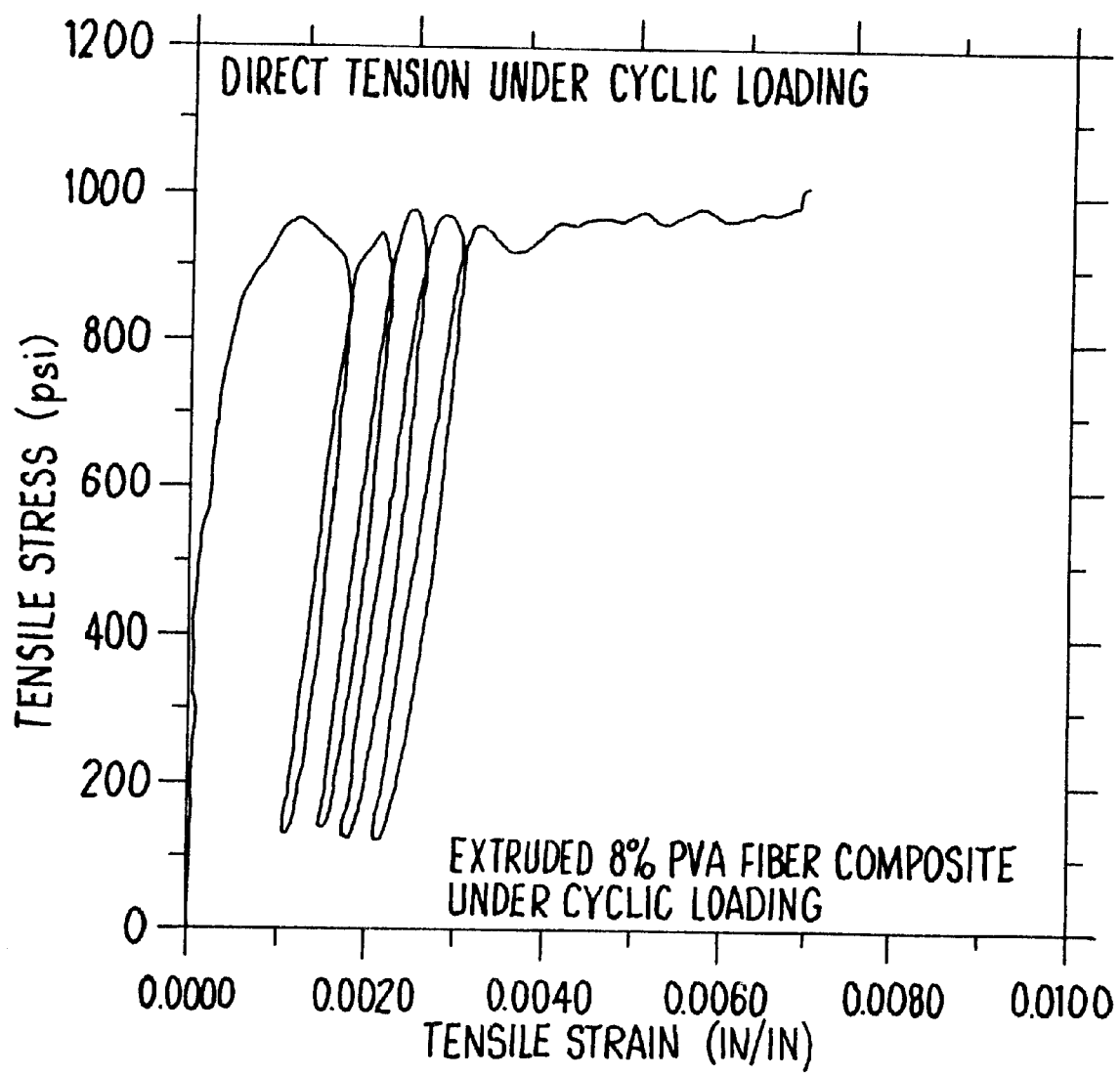
FIG. 5 is a graph of tensile stress versus tensile strain under cyclic loading for the cement matrix reinforced with 8 volume % discontinuous polyvinyl alcohol micro-fibers.

FIG. 5 illustrates the tensile stress versus tensile strain under cyclic loading for PVA fiber reinforced cured cement matrix composite specimens made from the Example compositions listed for specimens "pva8" in Table 2. It is evident that, after several load and unload cycles, the strain hardening response of the composite remains and no stiffness degradation was observed.

Figure 6:
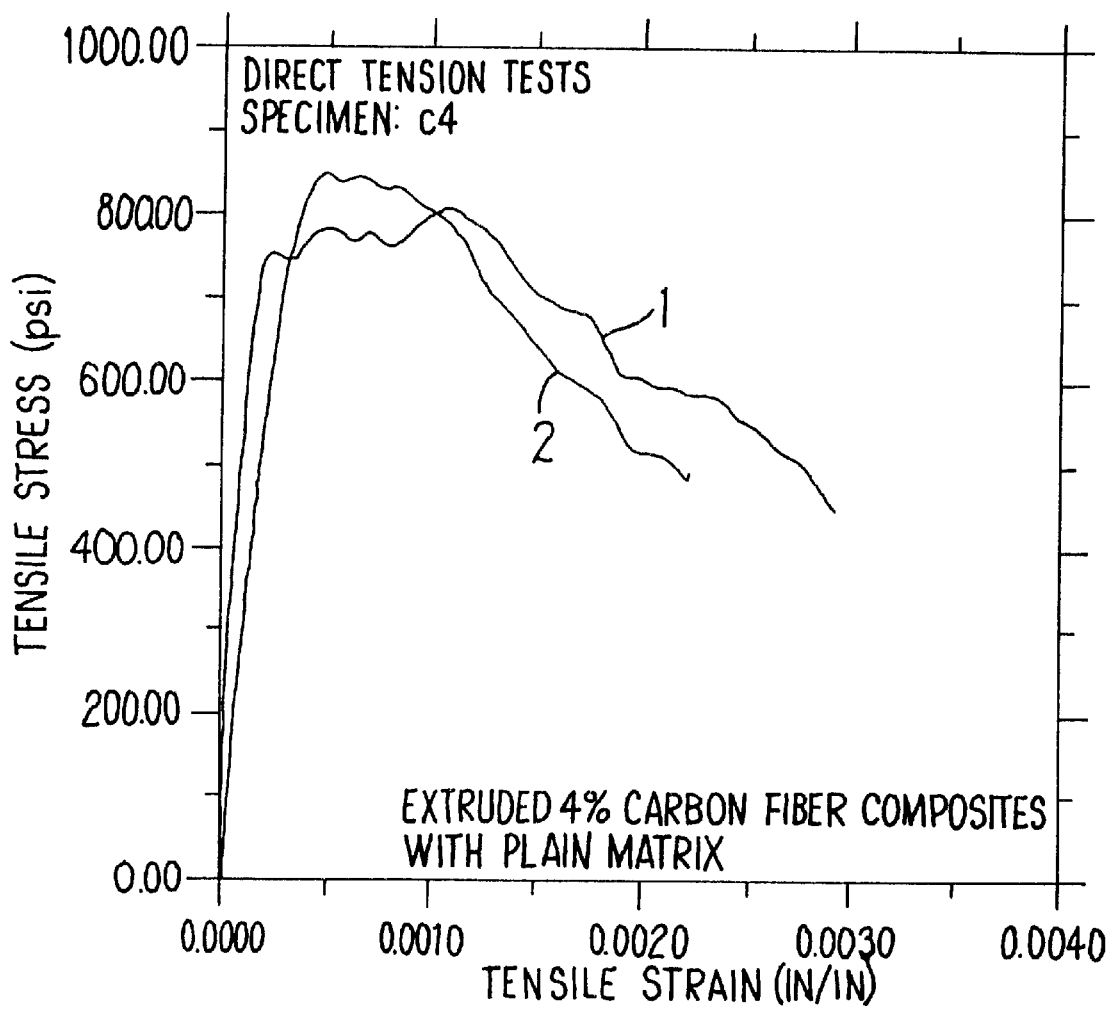
FIG. 6 illustrates graphs of tensile stress versus tensile strain for two (2) specimens comprising the cement matrix reinforced with 4 volume % discontinuous carbon micro-fibers.

FIG. 6 illustrates the tensile stress versus tensile strain under cyclic loading for carbon fiber reinforced cured cement matrix composite specimens made from the Example composition listed for specimens "c4" in Table 2. Both strength and toughness of the composite were enhanced compared to the unreinforced cement matrix, FIG. 3. No strain hardening behavior was observed for specimen "c4".

Figure 7:
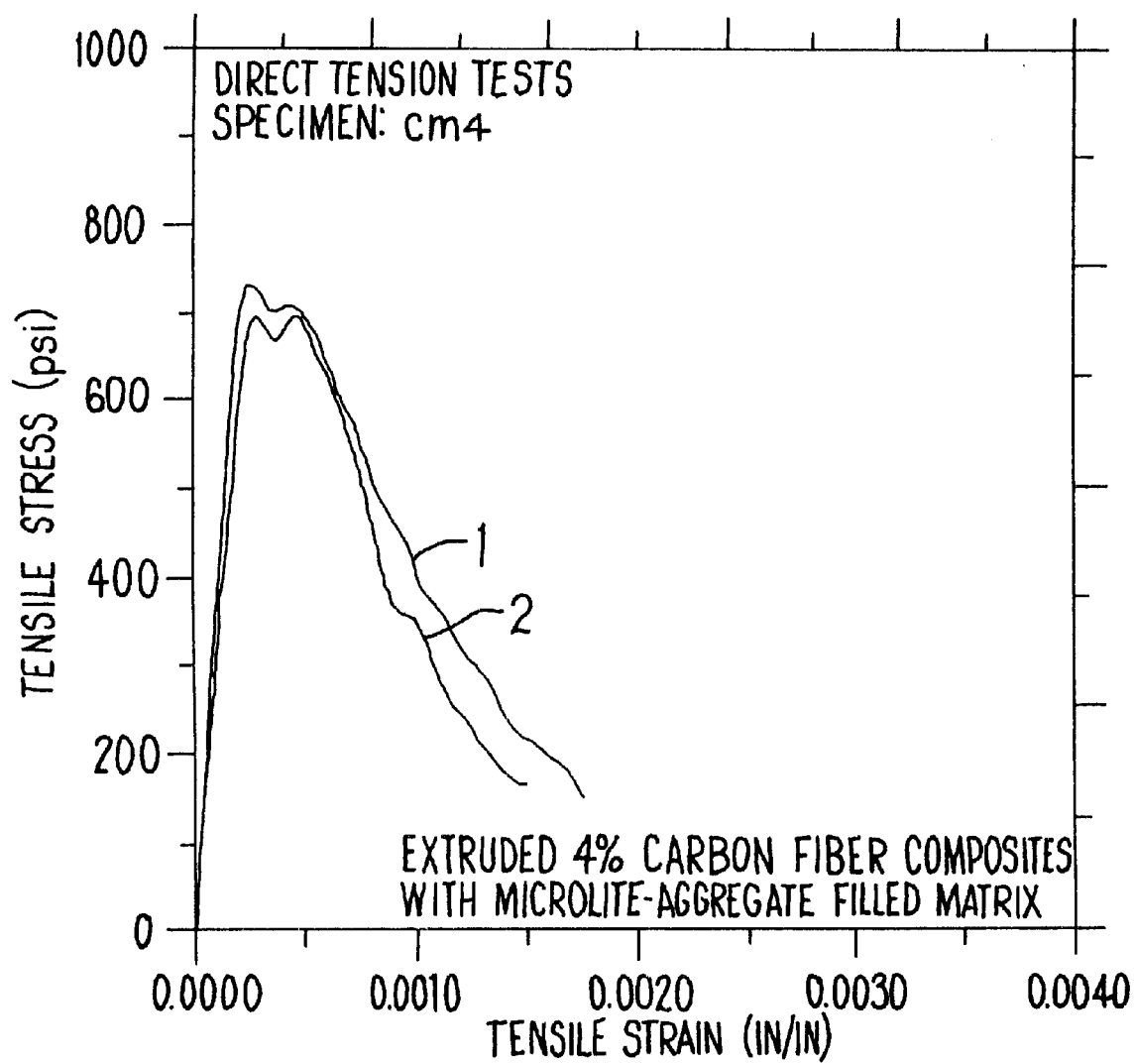
FIG. 7 illustrates graphs of tensile stress versus tensile strain for two (2) specimens comprising the microlite-aggregate filled cement matrix reinforced with 4 volume % discontinuous carbon micro-fibers.

FIG. 7 illustrates the tensile stress versus tensile strain under cyclic loading for carbon fiber reinforced cured cement matrix composite specimens made from the Example composition listed for specimens "cm4" in Table 2 wherein lightweight aggregate is added to the composition. Although the stress-strain curves of the aggregate-filled composite were comparable to those of the unfilled specimen "c4", the strength and toughness of the aggregate-filled composite specimen "cm4" were lower. This reduction in strength and toughness might be attributable to porous cellular structure of the lightweight aggregate. This suggests using solid aggregate filler in lieu of the porous filler used in the Example.

Figure 8A:
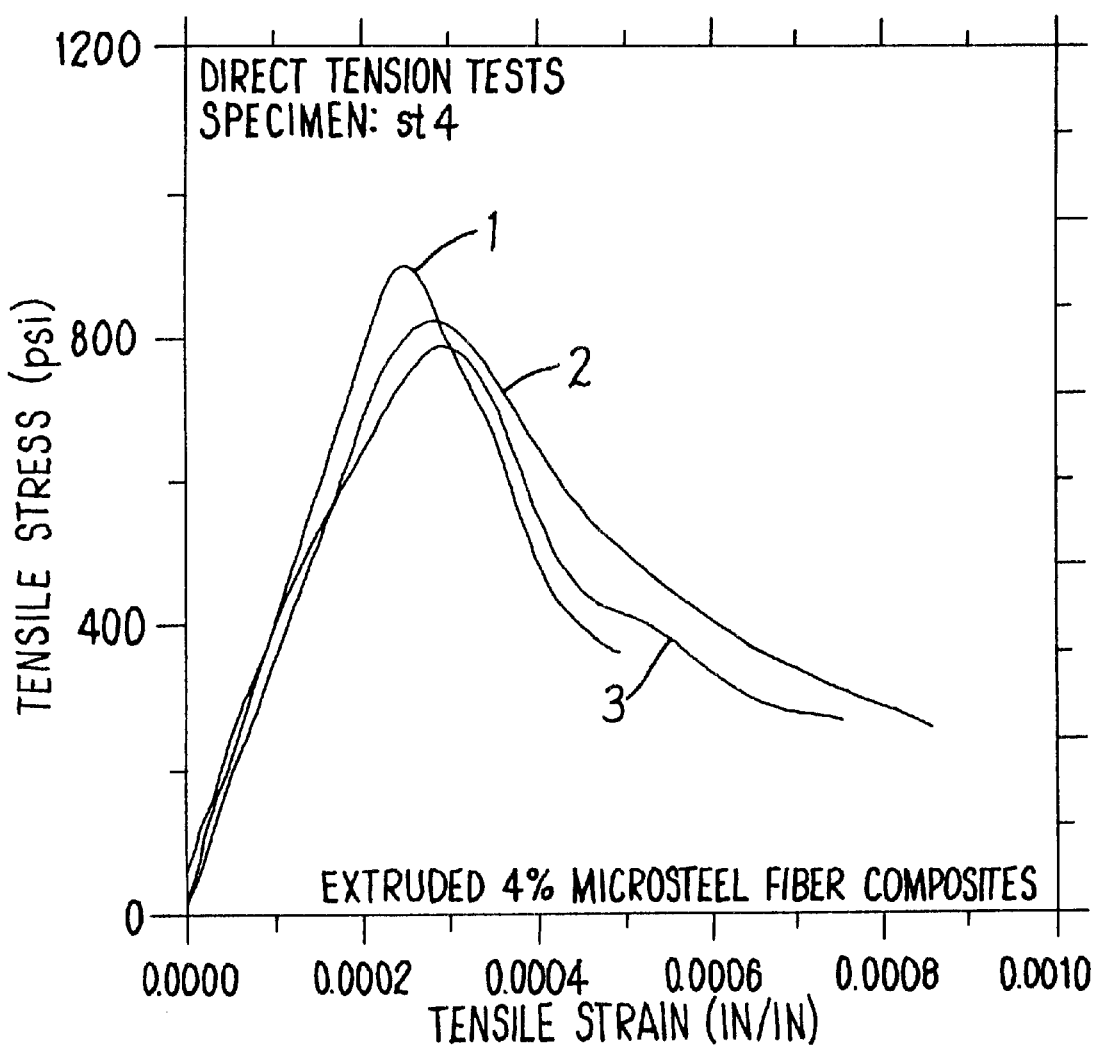
FIG. 8A illustrates graphs of tensile stress versus tensile strain for three (3) specimens comprising the cement matrix reinforced with 4 volume % and FIG. 8B illustrates similar data for two (2) specimens comprising 8 volume % discontinuous steel micro-fibers, respectively.
Figure 8B:
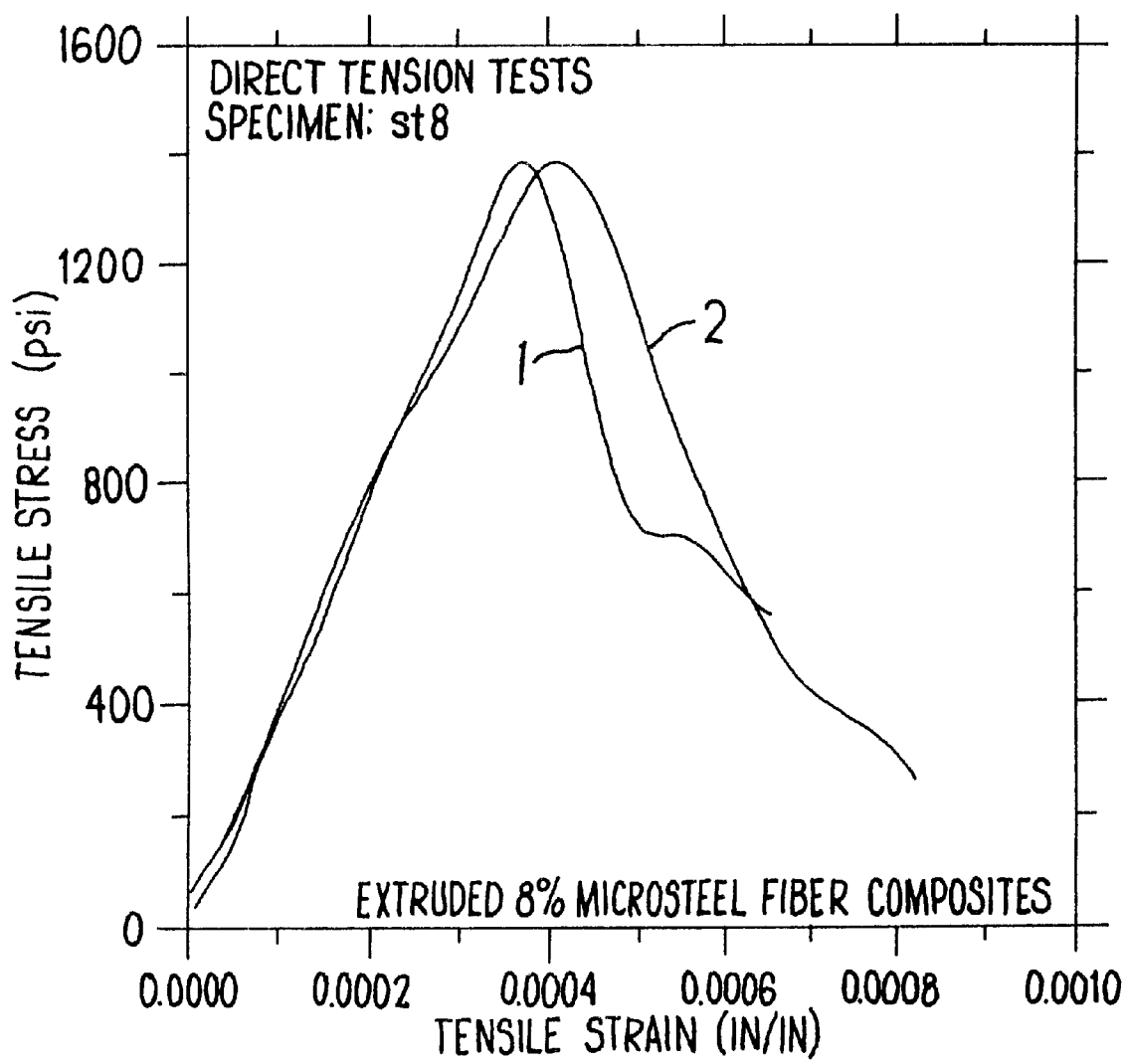

FIGS. 8A and 8B illustrate the tensile stress versus tensile strain for microsteel fiber reinforced cured cement matrix composite specimens made from the Example compositions listed for specimens "st4" and "st8" in Table 2. The 8% microsteel composite specimen exhibited a tensile strength as high as 1800 psi compared to a tensile strength of 820 psi for the 4% microsteel composite specimen. The toughness of the 4% and 8% microsteel composite specimens was about the same, however. The average Young's modulus of the specimens is shown in Table 3. The 4% and 8% microsteel fiber reinforced composite specimens did not exhibit strain hardening behavior in the tension tests. With a longer steel microfiber, strain hardening may be possible.

Figure 9:
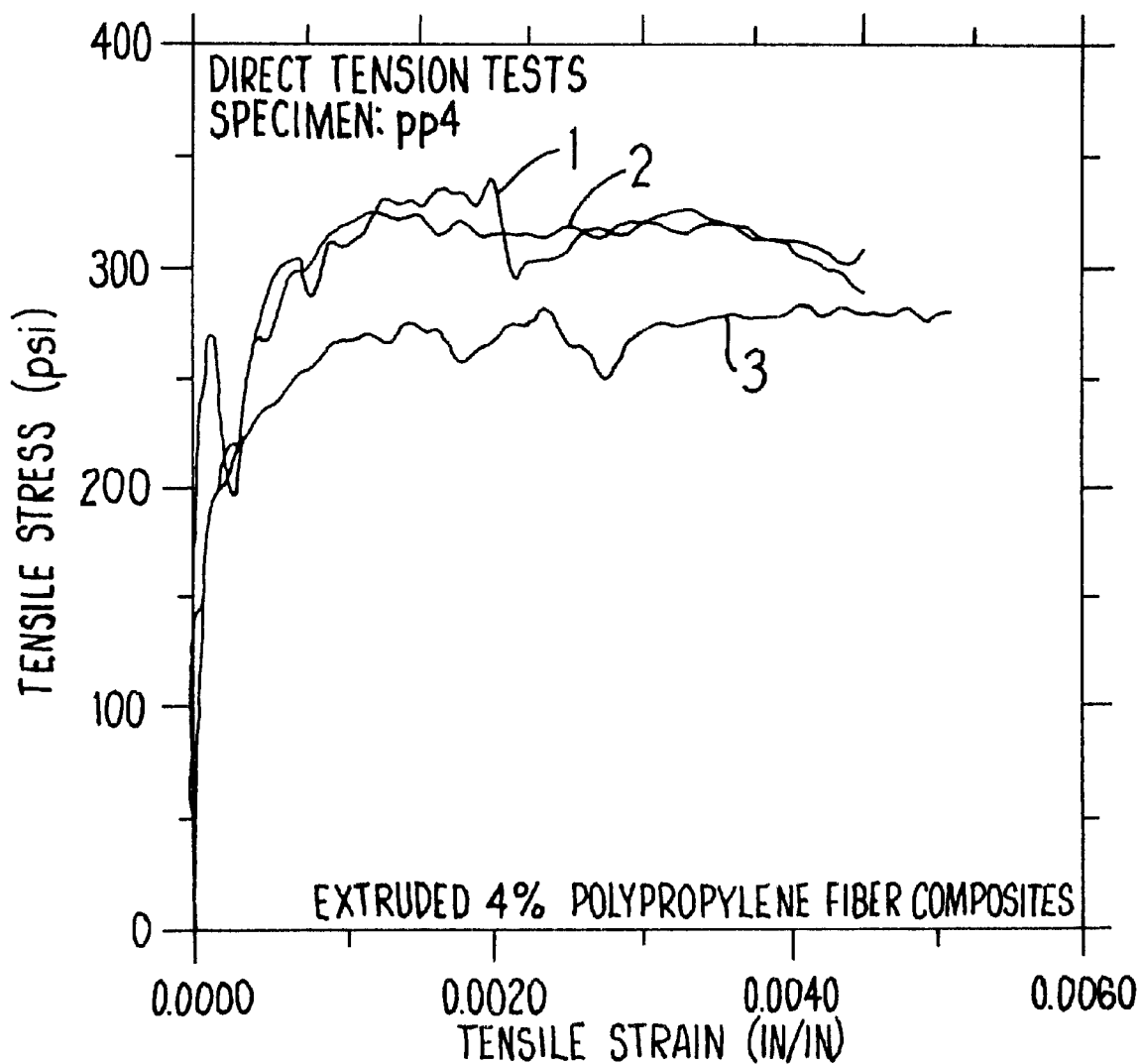
FIG. 9 illustrates graphs of tensile stress versus tensile strain for three (3) specimens comprising the cement matrix reinforced with 4 volume % discontinuous polypropylene micro-fibers.

FIG. 9 illustrates the tensile stress versus tensile strain for the polypropylene (PP) fiber reinforced cured cement matrix composite specimens made from the Example composition listed for specimens "pp4" in Table 2. The specimens exhibited strain hardening behavior in the tension tests. The tensile strength of the composite is very low compared to the unreinforced cement matrix, FIG. 3. The low tensile strength is perhaps attributable to lower packing density due to longer fiber length.

Figure 10:
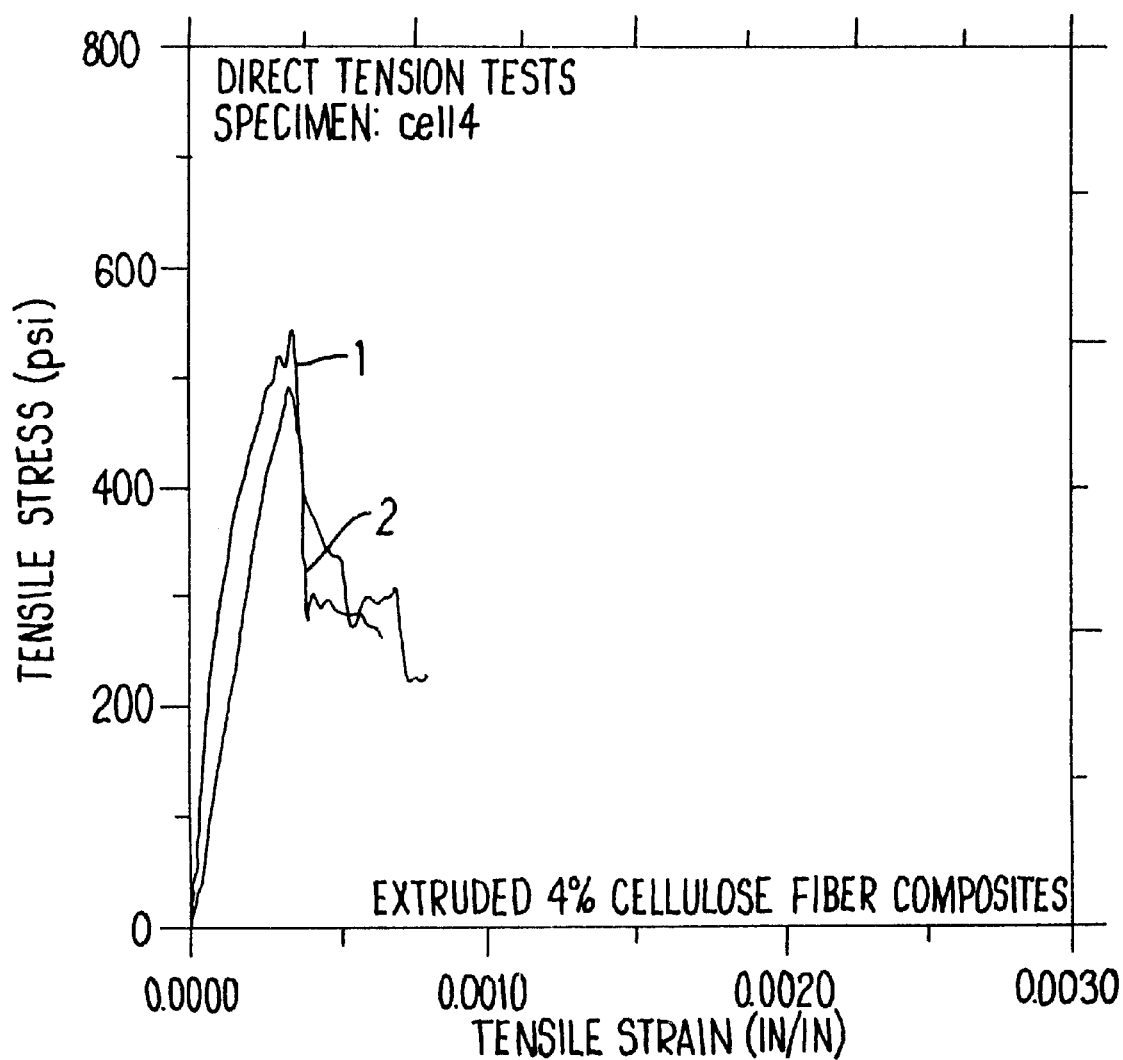
FIG. 10 illustrates graphs of tensile stress versus tensile strain for two (2) specimens comprising the cement matrix reinforced with 4 volume % and FIG. 11 illustrates similar data for three (3) specimens comprising 8 volume % discontinuous cellulose micro-fibers, respectively.
Figure 11:
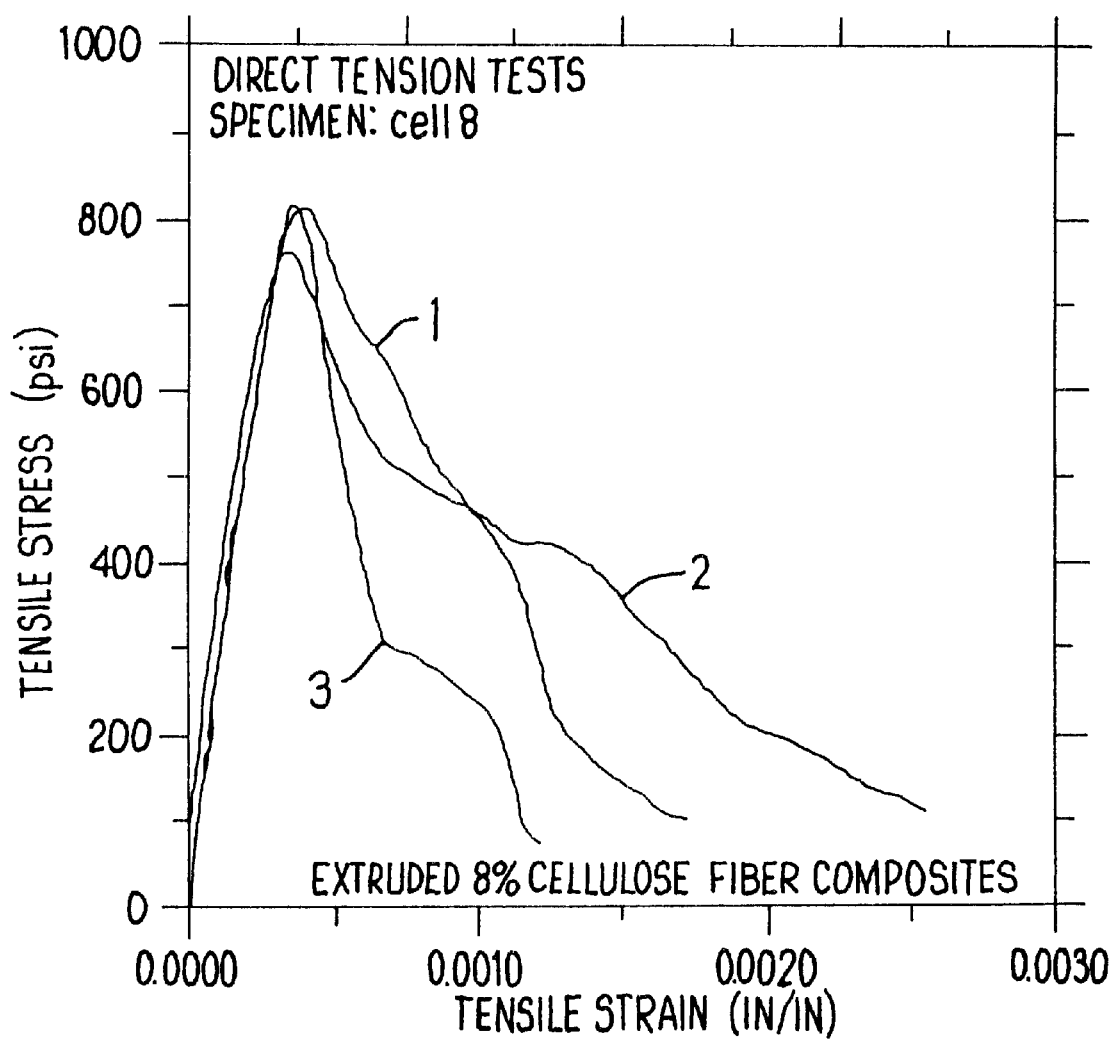

FIGS. 10 and 11 illustrate the tensile stress versus tensile strain for cellulose fiber reinforced cured cement matrix composite specimens made from the Example compositions listed for specimens "cell4" and "cell8" in Table 2. The 4% cellulose composite specimens was only slightly improved compared to the unreinforced cement matrix, FIG. 3. On the other hand, the strength and toughness of the 8% cellulose composite specimens were substantially improved compared to the unreinforced cement matrix. A high volume fraction of cellulose greater than 4% thus is necessary to achieve substantially improvements in tensile strength and toughness of the composite. The average Young's modulus of the specimens is shown in Table 3. The 4% and 8% microsteel fiber reinforced composite specimens did not exhibit strain hardening behavior in the tension tests.

Table 3 herebelow summarizes the mechanical properties of the above discussed test composite specimens of the invention as well as the unreinforced cement matrix control specimen listed in Table 2.

TABLE 3

| Fiber fraction | Specimen | Fiber type | Tensile strength | Young's modulus |
|---|---|---|---|---|
| 0% | control | none | 488 ± 20 psi | 4.00 ± 0.7 × $10^6$ psi |
| 4% | pva4 | PVA | 783 ± 40 psi | 3.47 ± 0.5 × $10^6$ psi |
| | c4 | carbon | 775 ± 75 psi | 2.41 ± 0.8 × $10^6$ psi |
| | st4 | microsteel | 819 ± 85 psi | 3.64 ± 0.5 × $10^6$ psi |
| | cell4 | cellulose | 525 ± 25 psi | 1.94 ± 0.9 × $10^6$ psi |
| | pp4 | polypropylene | 338 ± 42 psi | 2.67 ± 0.6 × $10^6$ psi |

TABLE 3-continued

| Fiber fraction | Specimen | Fiber type | Tensile strength | Young's modulus |
|---|---|---|---|---|
| | cm4 | carbon | 638 ± 90 psi | 3.42 ± 0.4 × $10^6$ psi |
| 8% | pva8 | PVA | 985 ± 80 psi | 2.31 ± 0.6 × $10^6$ psi |
| | st8 | microsteel | 1390 ± 20 psi | 3.87 ± 0.3 × $10^6$ psi |
| | cell8 | cellulose | 807 ± 13 psi | 2.36 ± 0.2 × $10^6$ psi |

Figure 12:
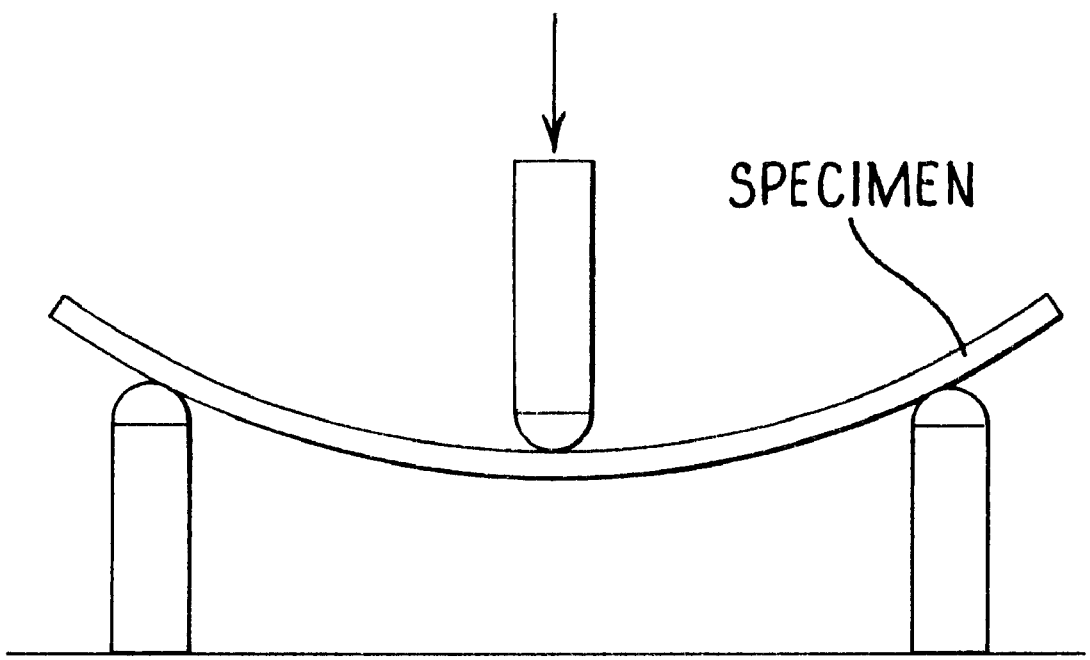
FIG. 12 is a schematic elevational view of the three point bending test fixture and specimen.
Figure 13A:
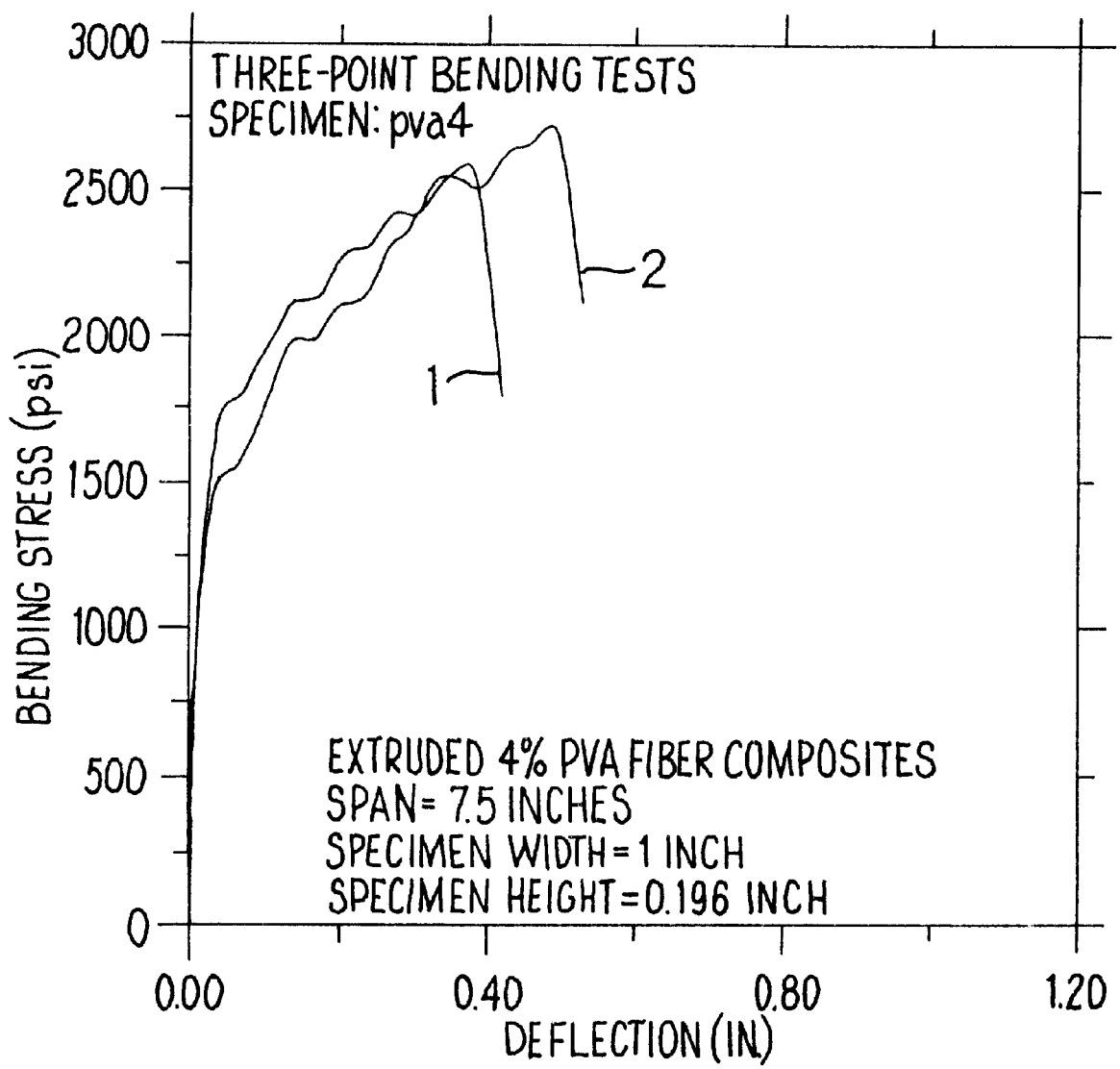
FIGS. 13A, 13B are graphs of bending stress versus deflection for two (2) specimens of the cement matrix reinforced with 4 volume % and 8 volume % of discontinuous polyvinyl alcohol micro-fibers, respectively.
Figure 13B:
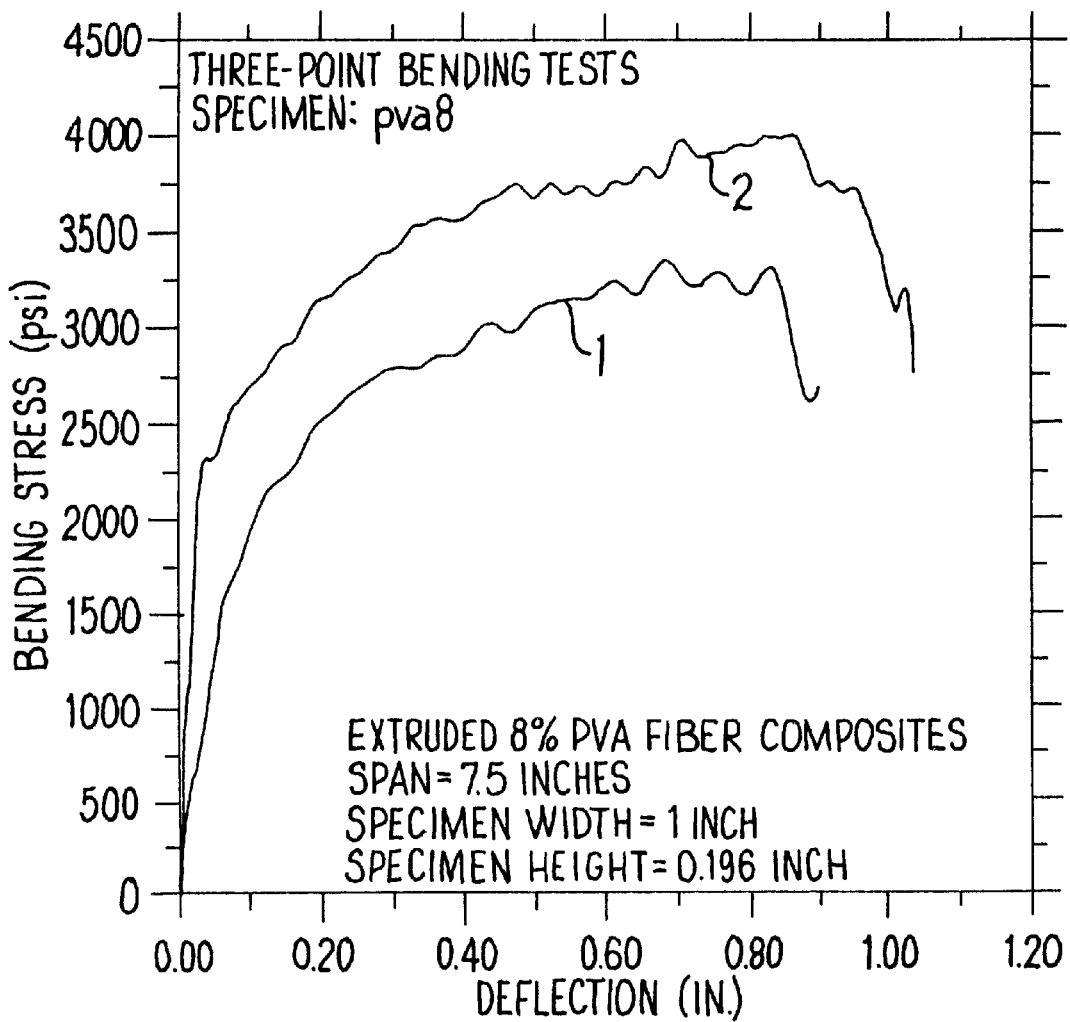

A conventional three point bending test apparatus and specimen, FIG. 12, were employed to determine the flexural performance of the 4% and 8% PVA composite specimens "pva4" and "pva8" in Table 2. specimen length was 12 inches, width was 1 inch and thickness was 0.196 inch. The length of the span of the specimen was 7.5 inches. The radius of the lower supports and upper plunger was 0.75 inch. FIGS. 13A and 13B comprise bending stress versus deflection curves for the "pva4" and "pva8" specimens, respectively.

FIGS. 13A and 13B indicate a large visible deflection at the peak bending load. The maximum deflection of the 4% PVA fiber composite specimens "pva4" was 0.5 inches in a span length of 7.5 inches with a flexural strength of 2700 psi. The maximum deflection of the 8% PVA fiber composite specimens "pva8" was 0.8 inches in a span length of 7.5 inches with a flexural strength of 4000 psi. Thus, the 4% and 8% PVA reinforced cement matrix composite specimens provide flexible fiber reinforced cementitious composites which are comparable to cementitious materials reinforced with continuous fibers.

Figure 14:
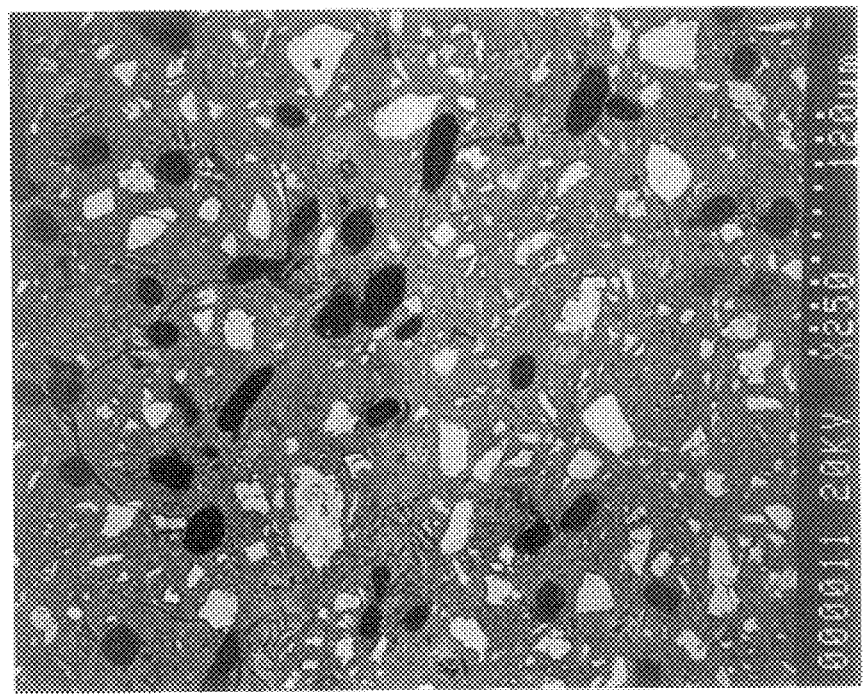
FIG. 14 is a scanning electron micrograph (back scatter image) 250×magnification of the polished cross-section (taken perpendicular to extrusion direction) of a polyvinyl alcohol fiber reinforced cement matrix composite of the invention (8 volume % PVA fibers).
Figure 16:
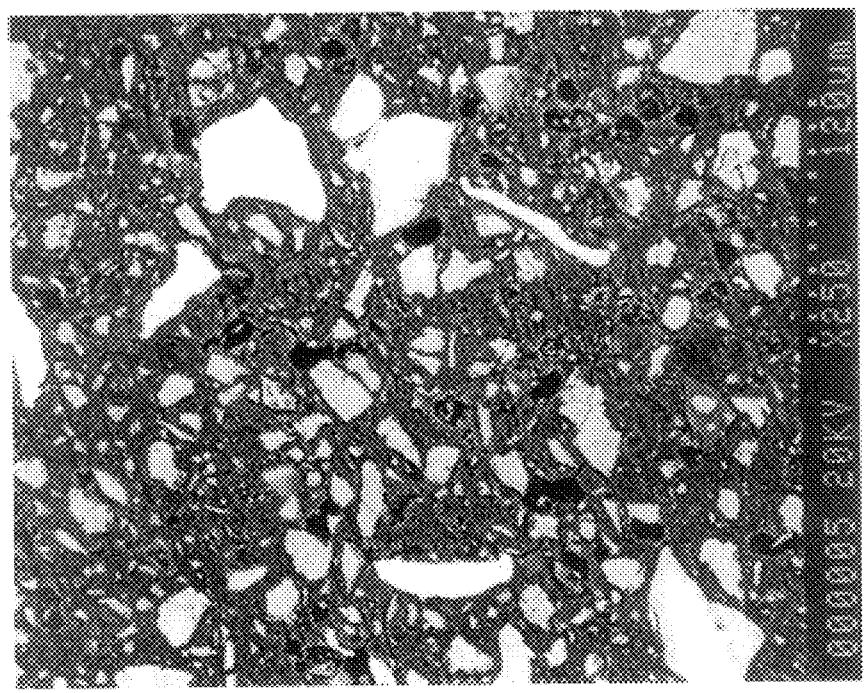
FIG. 16 is a scanning electron micrograph (back scatter image) at 250×magnification of the polished cross-section of a steel fiber reinforced cement matrix composite of the invention (8 volume % steel fibers).
Figure 15:
FIG. 15 is a scanning electron micrograph (back scatter image) at 250×magnification of the polished surface of a carbon fiber reinforced cement matrix composite of the invention (4 volume % carbon fibers).

FIGS. 14, 15, and 16 are scanning electron micrographs (back scatter image) at 250× magnification of the polished cross-section of a PVA fiber reinforced cement matrix composite of the invention (8 volume % PVA fibers), the polished cross-section of a carbon fiber reinforced cement matrix composite of the invention (4 volume % carbon fibers), and the polished cross-section of a steel fiber reinforced cement matrix composite of the invention (8 volume % steel fibers), respectively.

The fiber distribution or dispersal in the cement matrix appears to be uniform for all of these composites. The fibers in FIGS. 14 and 15 appear as black constituents. From FIG. 16, the microsteel fibers do not have a well defined size/shape as various size/shapes are evident. The microsteel fibers resemble the grey hydration products constituent and thus are difficult to identify. Composites containing PVA and microsteel fibers exhibit few shrinkage cracks. This is attributed to the pure cement and silica matrix used in the dough compositions. This can be overcome by modifying the matrix by incorporating fine sand and/or shrinkage resistant admixtures to the matrix.

Figure 17:
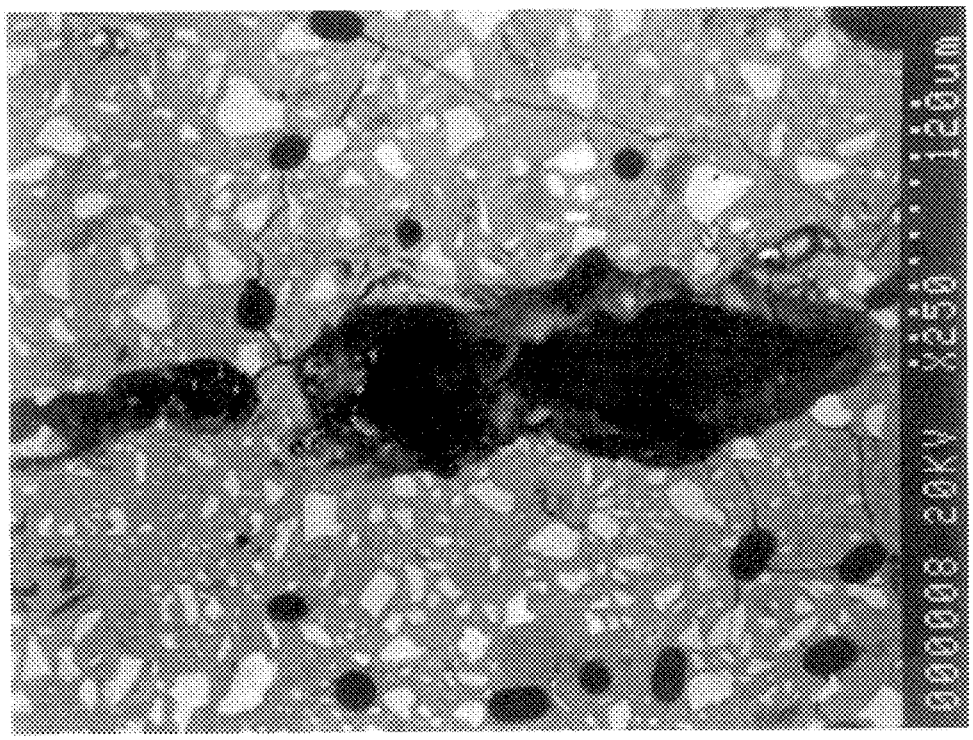
FIG. 17 is a scanning electron micrograph (back scatter image) at 250×magnification of the polished cross section of a carbon fiber reinforced cement composite of the invention (4 volume % carbon fibers).

The carbon composites exhibit major defects and also more shrinkage cracks as shown in FIG. 15 and FIG. 17, which is a scanning electron micrograph (back scatter image) at 250×magnification of the polished cross section of a carbon fiber reinforced cement composite of the invention (4 volume % carbon fibers). Study of these defects indicates a possible association with bunches of undispersed fibers which indicate fiber balling during mixing of the cementitious dough. Modifications to the mixing procedure used in the Examples can be made to improve dispersal of carbon fibers in the cementitious dough and thus fiber/cement matrix bonding in the composite, resulting in improved mechanical properties.

Figure 18:
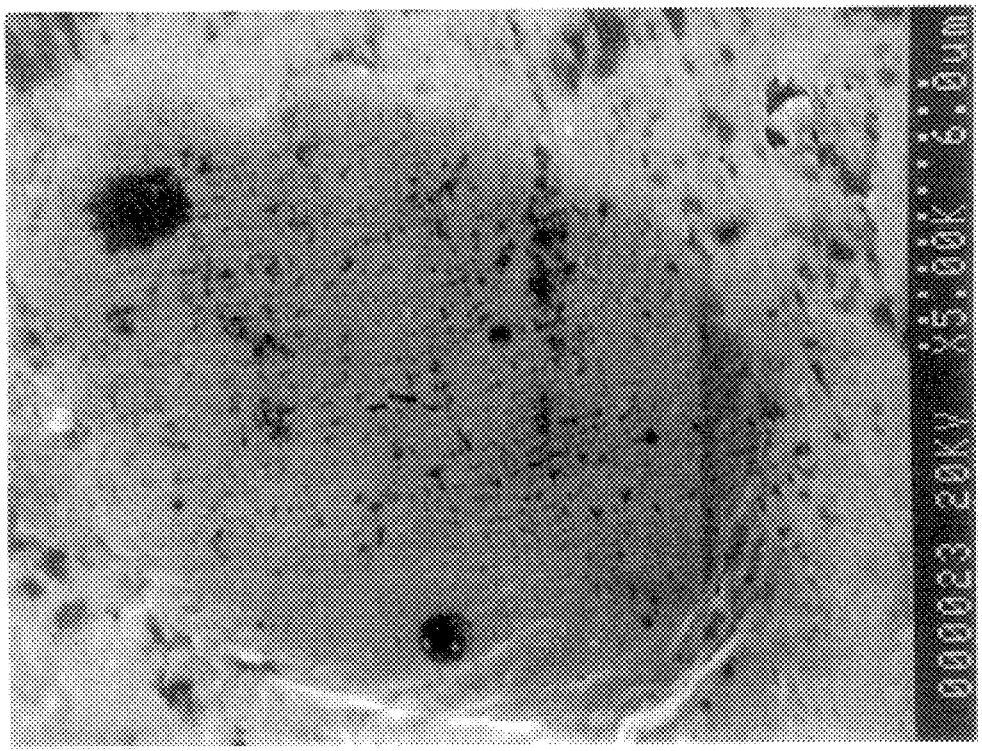
FIG. 18 is a scanning electron micrograph at 5000× magnification of the interface of a polyvinyl alcohol fiber and the cement matrix.

FIG. 18 is a scanning electron micrograph at 5000× magnification of the interface of a PVA fiber and the cured cement matrix for PVA fiber reinforced composite (4 volume % PVA fibers). The interface evidences very good bonding between the PVA fiber and the cement matrix. Such good bonding results in improved strength and toughness as well as strain hardening behavior. When longer steel microfibers are used, strain hardening may be possible.

The specimens of Table 3 all exhibited preferential fiber alignment in the extrusion direction to an extent similar to FIG. 21.

The extruded fiber reinforced cement matrix composites of the invention were compared to cast (non-extruded) composites comprising similar fibers/cement matrices. Comparison specimens included 4 volume % PVA fiber and 4 volume % carbon fiber in cementitous compositions set forth in Table 4 herebelow.

Figure 23:
FIG. 23 is a scanning electron micrograph at 30×magnification of a section of a simple cast (i.e. non-extruded) 4 volume % PVA fiber reinforced composite.

The microstructures of substantially preferentially aligned extruded fiber composite specimen and cast composite specimens were quite different. In particular, in FIG. 21, the extruded PVA fiber composite exhibited significant preferential alignment of the fibers along the direction of extrusion (corresponds to the vertical direction in FIG. 21) even though the fibers are substantially uniformly distributed throughout the cured cement matrix. For example, a majority of the fibers in FIG. 21 are aligned in the extrusion direction. The fibers will have the maximum contribution to the load carrying capacity of the composite when they are preferentially aligned in the load-bearing direction of the composite in a service application. The fibers also will achieve maximum packing density when they lie in the same direction. In contrast, in FIG. 23, the cast PVA fiber composite exhibited random orientation of the fibers throughout the cured cement matrix.

TABLE 4

| fiber fraction | specimen | process | fiber type | W/C | SF/C | Binder/C | HRWR/C | Tensile strength (psi) | Modulus (psi) |
|---|---|---|---|---|---|---|---|---|---|
| 4% | c4 | extruded | carbon | 0.248 | 0.18 | 0.014 | 2% | 966 | $2.6 \times 10^6$ |
|  | cc4 | cast | carbon | 0.40 | 0.18 | 0 | 2% | 390 | $0.8 \times 10^6$ |
| 4% | pva4 | extruded | PVA | 0.286 | 0.18 | 0.009 | 4.3% | 830 | $3.5 \times 10^6$ |
|  | cpva4 | cast | PVA | 0.286 | 0.18 | 0 | 6.3% | 572 | $1.1 \times 10^6$ |

C: Type I Portland cement; W: water; SF: silica fume in slurry; HRWR: high range water reducer;
Binder: 65% METHOCEL + 35% POLYOX.

The extruded fiber reinforced cement matrix composite specimens were made in the manner described hereabove. The cast specimens were made by casting the cementitous dough or paste in molds measuring 1 inch wide by 0.5 inch thick by 10 inches long. In making the cast specimens, the premixture of cement and silica fume slurry was mixed with a premixture of water and high range water reducer (HRWR) in proportions pursuant to Table 4. The appropriate fibers were then slowly fed into the resulting mixture. In making the cast carbon fiber composite specimens "cc4" of Table 4, more water was used while maintaining the HRWR at a constant amount. In making the cast PVA fiber composite specimens "cpva4" of Table 4, more HRWR was used while maintaining the water at a constant amount. These adjustments were made to improve castability of the mixtures (cementitious dough). Each mixture was immediately cast into an appropriate mold. The mixture was cured in the mold for 24 hours and then demolded. This specimen was then immersed in water for further curing for 28 days.

Figure 19:
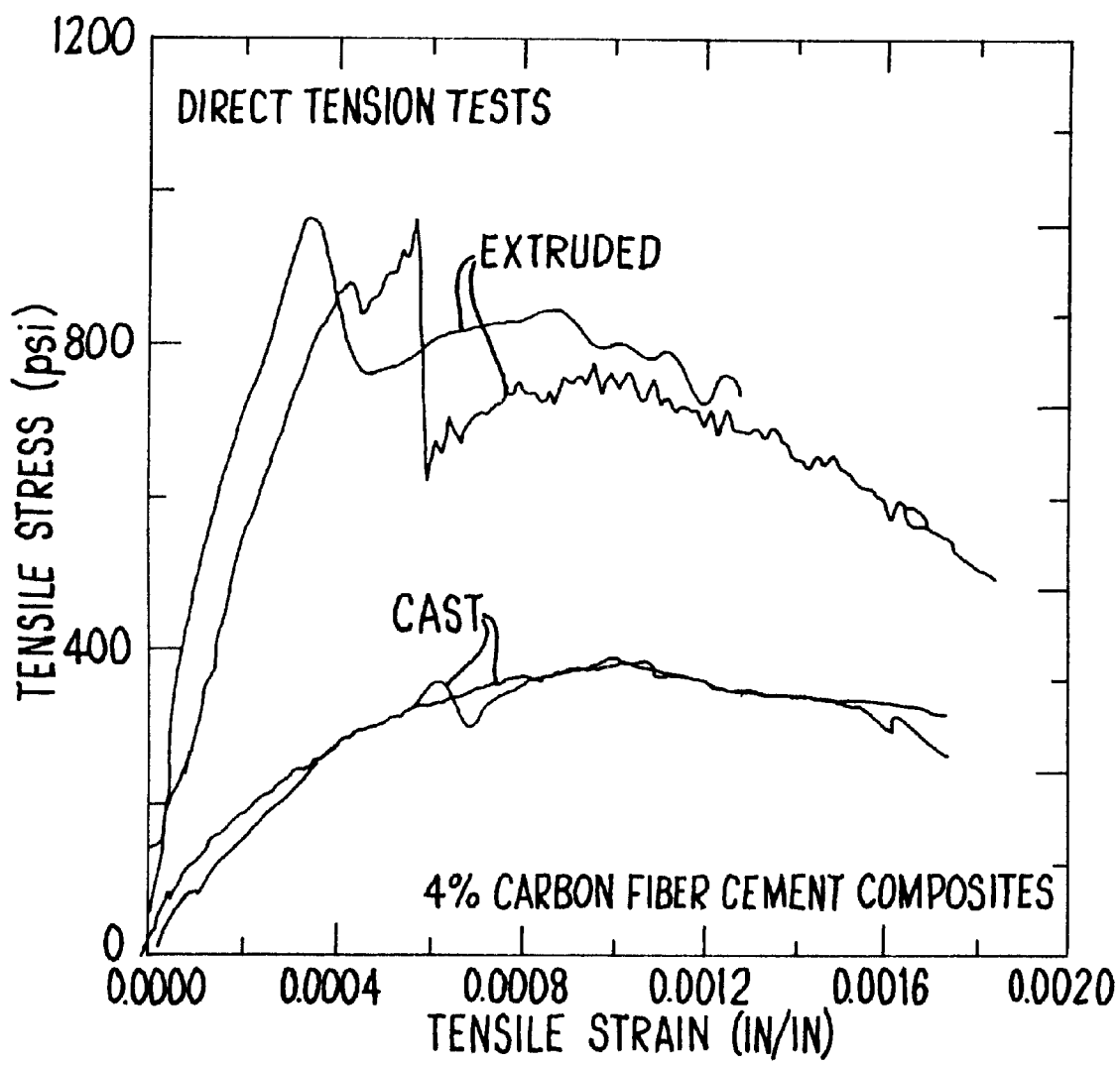
FIG. 19 is a graph of tensile stress versus tensile strain for two (2) specimens of the extruded 4 volume % carbon fiber reinforced composites of the invention and two (2) specimens of the simple cast (i.e. non-extruded) 4 volume % carbon fiber reinforced composites.

FIG. 19 compares the tensile stress versus tensile strain curves obtained for 4% carbon fiber composite specimens "c4" and "cc4" of Table 4 using the test procedure described hereabove. The tensile strength of the extruded composite specimens "c4" was twice as high as that of the cast specimens "cc4". The energy density (the area under the tensile stress-tensile strain curve) released by the extruded composite specimen "c4" was much larger than that released by the cast specimen "cc4"', indicating a large increase in the toughness of the composite made by extrusion.

Figure 20:
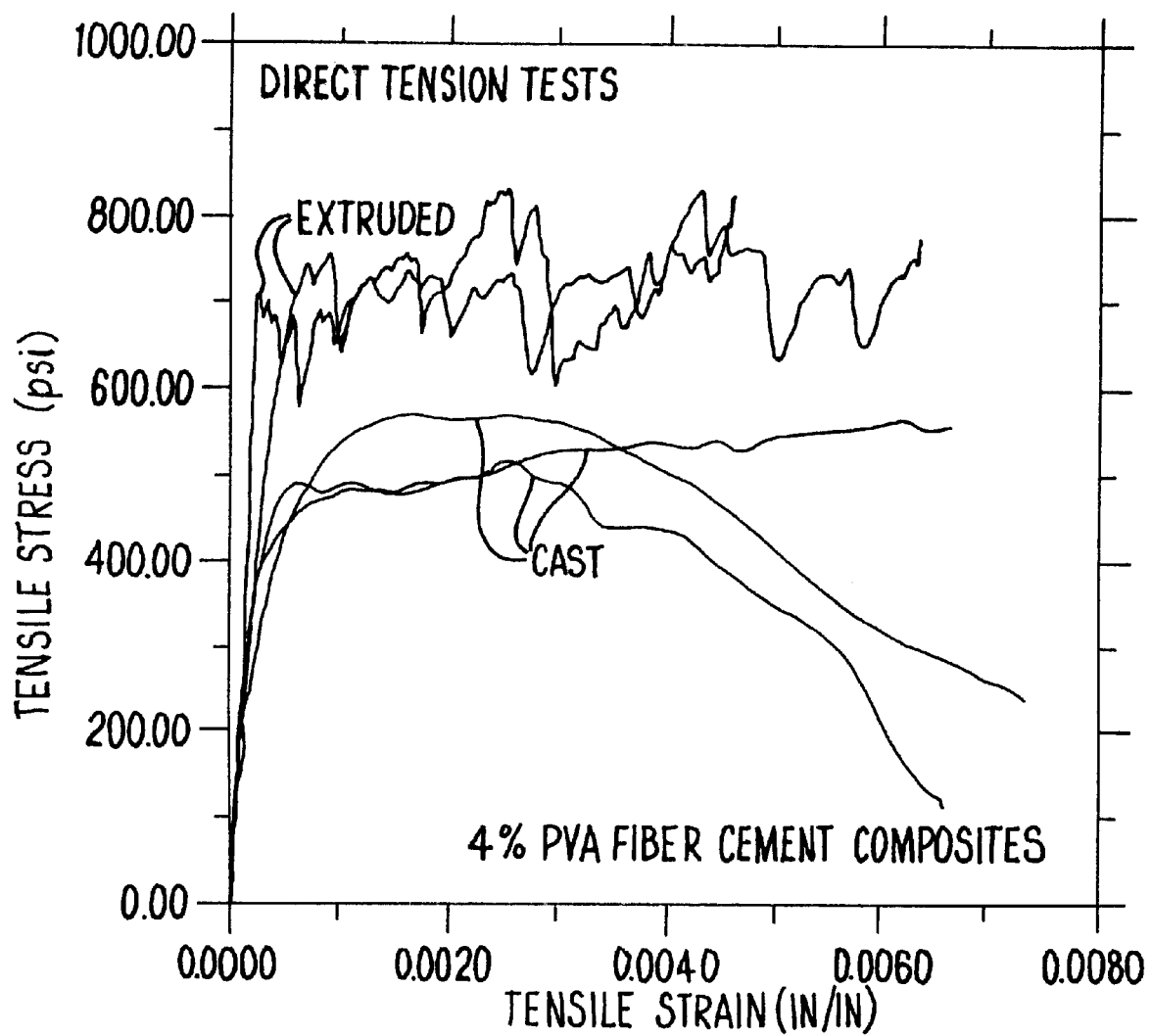
FIG. 20 is a graph of tensile stress versus tensile strain for two (2) specimens of the extruded 4 volume % polyvinyl alcohol fiber reinforced composites of the invention and three (3) specimens of simple cast (i.e non-extruded) 4 volume % carbon fiber reinforced composites.

FIG. 20 compares the tensile stress versus tensile strain curves obtained for 4% PVA fiber composite specimens "pva4" and "cpva4" of Table 4 using the test procedure described hereabove. The tensile strength and the toughness of the extruded composite specimens "pva4" was much higher than those of the cast specimens "cpva4". Moreover, the extruded PVA composite specimens exhibited strain hardening behavior and multiple cracking in the tension tests, although multiple cracking occurred occasionally in the cast specimens "cpva4".

As mentioned hereabove, the invention also can be practiced using parameters where there is little or no preferential fiber alignment in the extrusion direction and yet still achieve increased tensile properties are achieved in all directions of the composite as compared to cast composites of similar composition. FIG. 22 illustrates an extruded composite microstructure of the invention to this end; i.e. where there is little or no preferential fiber alignment in the extrusion direction. The composite specimen comprised 4 volume % carbon fiber in a cement matrix (specimen "c4" in Table 2). This specimen was extruded using the auger extruder described hereabove but where extrusion parameters were varied (e.g. by decreasing extruder speed and increasing dough viscosity) to achieve little or no fiber alignment in the extrusion direction in the cement matrix. The carbon fiber clumping visible in FIG. 22 is discussed above.

The extruded fiber reinforced cement matrix composites of the invention can used in a variety of service applications. For example, commercial and residential uses would involve flat and corrugated sheet roofing elements, exterior and interior wall panels, equipment screens, fasia, facades and soffits, substrates for tiles, window sills and stools, stair treads and risers, substrates for coatings, utility building cladding panels and other myriad applications. Agricultural uses would involve farm buildings, sidings, stalls and walls, poultry houses and incubators, green house panels and work surfaces, fencing, sun screens and others. The extruded fiber reinforced composites of the invention can be made not only as flat sheets or panels but also as shaped configurations including, but not limited to, I-beams, channels, pipes, honeycomb, tubes, and other hollow shapes.

Although the invention has been described hereabove with respect to certain embodiments thereof, the invention can be subject to modifications, changes, and adaptations to be considered within the scope of the invention as set forth by the appended claims.

The embodiments of the invention in which an exclusive property or privilege is claimed are defined as follows:

1. An extruded fiber reinforced cement matrix composite having a die extruded shape and improved tensile properties in one or more directions compared to a cast composite of similar composition, comprising a cured cement matrix and discontinuous polyvinyl alcohol reinforcing fibers dispersed in the matrix.

2. An extruded fiber reinforced cement matrix composite having a die extruded shape and improved tensile properties in all directions compared to a cast composite of similar composition, comprising a cured cement matrix and discontinuous polyvinyl alcohol reinforcing fibers dispersed in the matrix and preferentially aligned in an extrusion direction of the composite.

3. An extruded fiber reinforced cement matrix composite having an extruded shape and having a cured cement matrix with discontinuous polyvinyl alochol reinforcing fibers dispersed in the matrix to provide a tensile strength of at least 750 psi in an extrusion direction, strain hardening behavior with at least 1% tensile strain, and improved flexural strength in three-point bending compared to unreinforced matrix.

4. The composite of one of claim 2 or 3 wherein the fibers are present from 4% to 10% by volume based on dry constituents of the composite.

5. An extruded fiber reinforced cement matrix composite having an extruded shape and having improved tensile properties in all directions compared to unreinforced matrix, strain hardening behavior with tensile strain, and improved flexural strength in three-point bending compared to unreinforced matrix, comprising a cured cement matrix and discontinuous polyvinyl alcohol reinforcing fibers dispersed in the matrix and preferentially aligned in an extrusion direction to an extent to provide increased tensile properties in said extrusion direction, provide said strain hardening behavior and provide said flexural strength.

* * * * *

UNITED STATES PATENT AND TRADEMARK OFFICE
CERTIFICATE OF CORRECTION

PATENT NO.    : 6,528,151 B1
DATED         : March 4, 2003
INVENTOR(S)   : Surrenda Shah et al.

It is certified that error appears in the above-identified patent and that said Letters Patent is hereby corrected as shown below:

Column 18,
Line 1, replace "claim" with -- claims --.

Signed and Sealed this

Seventeenth Day of June, 2003

JAMES E. ROGAN
*Director of the United States Patent and Trademark Office*